(12) United States Patent
Petrovic

(10) Patent No.: US 8,745,403 B2
(45) Date of Patent: Jun. 3, 2014

(54) ENHANCED CONTENT MANAGEMENT BASED ON WATERMARK EXTRACTION RECORDS

(75) Inventor: Rade Petrovic, San Diego, CA (US)

(73) Assignee: Verance Corporation, San Diego, CA (US)

(*) Notice: Subject to any disclaimer, the term of this patent is extended or adjusted under 35 U.S.C. 154(b) by 173 days.

(21) Appl. No.: 13/304,097

(22) Filed: Nov. 23, 2011

(65) Prior Publication Data

US 2013/0132727 A1  May 23, 2013

(51) Int. Cl.
*H04L 9/32* (2006.01)
*G04F 7/04* (2006.01)
*H04L 29/06* (2006.01)

(52) U.S. Cl.
CPC .............. *H04L 9/3281* (2013.01); *H04L 63/08* (2013.01)
USPC ............................................. 713/176; 726/3

(58) Field of Classification Search
CPC ............................. H04L 9/3281; H04L 63/08
USPC .............................................. 713/176; 726/3
See application file for complete search history.

(56) References Cited

U.S. PATENT DOCUMENTS

| | | | |
|---|---|---|---|
| 3,406,344 A | 10/1968 | Hopper | |
| 3,842,196 A | 10/1974 | Loughlin | |
| 3,885,217 A | 5/1975 | Cintron | |
| 3,894,190 A | 7/1975 | Gassmann | |
| 3,919,479 A | 11/1975 | Moon et al. | |
| 3,973,206 A | 8/1976 | Haselwood et al. | |
| 4,048,562 A | 9/1977 | Haselwood et al. | |
| 4,176,379 A | 11/1979 | Wessler et al. | |
| 4,199,788 A | 4/1980 | Tsujimura | |
| 4,225,967 A | 9/1980 | Miwa et al. | |
| 4,230,990 A | 10/1980 | Lert, Jr. et al. | |
| 4,281,217 A | 7/1981 | Dolby | |
| 4,295,128 A | 10/1981 | Hashemian et al. | |
| 4,425,578 A | 1/1984 | Haselwood et al. | |

(Continued)

FOREIGN PATENT DOCUMENTS

| | | |
|---|---|---|
| CA | 2276638 A1 | 1/2000 |
| EP | 282734 A1 | 9/1988 |

(Continued)

OTHER PUBLICATIONS

Kutter, M., et al., "The watermark copy attack," Proc. of the SPIE: Security and Watermarking of Multimedia Content II, 3971:1-10, Jan. 2000.

(Continued)

*Primary Examiner* — Saleh Najjar
*Assistant Examiner* — Oleg Korsak
(74) *Attorney, Agent, or Firm* — Perkins Coie LLP; Donald L. Wenskay

(57) ABSTRACT

Content screening operations are facilitated in devices that receive a content that is subject to screening obligations. When such a content is received at a device, a watermark extraction record is obtained and accessed to fulfill content screening obligations. Upon the receipt of such an extraction record, verification of the received extraction record is carried out based on a verification rate. If the verification is successful for an extraction record with permissive information, the verification rate is decreased, thereby reducing the processing load of the device. If the verification is unsuccessful, the verification rate is increased, which can adversely affect the processing load of the device.

6 Claims, 9 Drawing Sheets

(56) References Cited

U.S. PATENT DOCUMENTS

| | | |
|---|---|---|
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. |
| 6,160,986 A | 12/2000 | Gabai et al. |
| 6,173,271 B1 | 1/2001 | Goodman et al. |
| 6,175,627 B1 | 1/2001 | Petrovic et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |

(56) References Cited

U.S. PATENT DOCUMENTS

| | | |
|---|---|---|
| 6,246,775 B1 | 6/2001 | Nakamura et al. |
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |
| 6,268,866 B1 | 7/2001 | Shibata |
| 6,278,792 B1 | 8/2001 | Cox et al. |
| 6,282,299 B1 | 8/2001 | Tewfik et al. |
| 6,285,774 B1 | 9/2001 | Schumann et al. |
| 6,289,108 B1 | 9/2001 | Rhoads |
| 6,290,566 B1 | 9/2001 | Gabai et al. |
| 6,330,335 B1 | 12/2001 | Rhoads |
| 6,330,672 B1 | 12/2001 | Shur |
| 6,332,031 B1 | 12/2001 | Rhoads et al. |
| 6,332,194 B1 | 12/2001 | Bloom et al. |
| 6,353,672 B1 | 3/2002 | Rhoads |
| 6,363,159 B1 | 3/2002 | Rhoads |
| 6,373,974 B2 | 4/2002 | Zeng |
| 6,374,036 B1 | 4/2002 | Ryan et al. |
| 6,381,341 B1 | 4/2002 | Rhoads |
| 6,385,330 B1 | 5/2002 | Powell et al. |
| 6,388,712 B1 | 5/2002 | Shinohara et al. |
| 6,389,152 B2 | 5/2002 | Nakamura et al. |
| 6,389,538 B1 | 5/2002 | Gruse et al. |
| 6,400,826 B1 | 6/2002 | Chen et al. |
| 6,400,827 B1 | 6/2002 | Rhoads |
| 6,404,781 B1 | 6/2002 | Kawamae et al. |
| 6,411,725 B1 | 6/2002 | Rhoads |
| 6,415,040 B1 | 7/2002 | Linnartz et al. |
| 6,415,041 B1 | 7/2002 | Oami et al. |
| 6,424,726 B2 | 7/2002 | Nakano et al. |
| 6,427,012 B1 * | 7/2002 | Petrovic ................... 380/238 |
| 6,430,301 B1 | 8/2002 | Petrovic |
| 6,430,302 B2 | 8/2002 | Rhoads |
| 6,449,367 B2 | 9/2002 | Van Wie et al. |
| 6,449,496 B1 | 9/2002 | Beith et al. |
| 6,473,560 B1 | 10/2002 | Linnartz et al. |
| 6,477,431 B1 | 11/2002 | Kalker et al. |
| 6,487,301 B1 | 11/2002 | Zhao |
| 6,490,355 B1 | 12/2002 | Epstein |
| 6,496,591 B1 | 12/2002 | Rhoads |
| 6,505,160 B1 | 1/2003 | Levy et al. |
| 6,510,233 B1 | 1/2003 | Nakano |
| 6,510,234 B1 | 1/2003 | Cox et al. |
| 6,512,837 B1 | 1/2003 | Ahmed |
| 6,523,113 B1 | 2/2003 | Wehrenberg |
| 6,529,506 B1 | 3/2003 | Yamamoto et al. |
| 6,530,021 B1 | 3/2003 | Epstein et al. |
| 6,550,011 B1 | 4/2003 | Sims, III |
| 6,553,127 B1 | 4/2003 | Kurowski |
| 6,556,688 B1 | 4/2003 | Ratnakar |
| 6,557,103 B1 | 4/2003 | Boncelet, Jr. et al. |
| 6,570,996 B1 | 5/2003 | Linnartz |
| 6,571,144 B1 | 5/2003 | Moses et al. |
| 6,574,350 B1 | 6/2003 | Rhoads et al. |
| 6,577,744 B1 | 6/2003 | Braudaway et al. |
| 6,584,138 B1 | 6/2003 | Neubauer et al. |
| 6,590,996 B1 | 7/2003 | Reed et al. |
| 6,590,997 B2 | 7/2003 | Rhoads |
| 6,591,365 B1 | 7/2003 | Cookson |
| 6,592,516 B2 | 7/2003 | Lee |
| 6,598,162 B1 | 7/2003 | Moskowitz |
| 6,614,914 B1 | 9/2003 | Rhoads et al. |
| 6,618,484 B1 | 9/2003 | Van Wie et al. |
| 6,625,297 B1 | 9/2003 | Bradley |
| 6,633,653 B1 | 10/2003 | Hobson et al. |
| 6,636,615 B1 | 10/2003 | Rhoads et al. |
| 6,636,967 B1 | 10/2003 | Koyano |
| 6,647,128 B1 | 11/2003 | Rhoads |
| 6,647,129 B2 | 11/2003 | Rhoads |
| 6,654,501 B1 | 11/2003 | Acharya et al. |
| 6,661,905 B1 | 12/2003 | Chupp et al. |
| 6,665,419 B1 | 12/2003 | Oami |
| 6,668,068 B2 | 12/2003 | Hashimoto |
| 6,671,376 B1 | 12/2003 | Koto et al. |
| 6,671,388 B1 | 12/2003 | Op De Beeck et al. |
| 6,674,861 B1 | 1/2004 | Xu et al. |
| 6,674,876 B1 | 1/2004 | Hannigan et al. |
| 6,675,146 B2 | 1/2004 | Rhoads |
| 6,678,389 B1 | 1/2004 | Sun et al. |
| 6,681,029 B1 | 1/2004 | Rhoads |
| 6,683,958 B2 | 1/2004 | Petrovic |
| 6,697,944 B1 | 2/2004 | Jones et al. |
| 6,700,990 B1 | 3/2004 | Rhoads |
| 6,704,431 B1 | 3/2004 | Ogawa et al. |
| 6,707,926 B1 | 3/2004 | Macy et al. |
| 6,721,439 B1 | 4/2004 | Levy et al. |
| 6,728,390 B2 | 4/2004 | Rhoads et al. |
| 6,737,957 B1 | 5/2004 | Petrovic et al. |
| 6,738,495 B2 | 5/2004 | Rhoads et al. |
| 6,744,906 B2 | 6/2004 | Rhoads et al. |
| 6,748,360 B2 | 6/2004 | Pitman et al. |
| 6,751,337 B2 | 6/2004 | Tewfik et al. |
| 6,757,908 B1 | 6/2004 | Vogel |
| 6,768,807 B1 | 7/2004 | Muratani |
| 6,771,797 B2 | 8/2004 | Ahmed |
| 6,785,399 B2 | 8/2004 | Fujihara |
| 6,785,401 B2 | 8/2004 | Walker et al. |
| 6,785,815 B1 | 8/2004 | Serret-Avila et al. |
| 6,792,542 B1 | 9/2004 | Lee et al. |
| 6,798,893 B1 | 9/2004 | Tanaka |
| 6,801,999 B1 | 10/2004 | Venkatesan et al. |
| 6,823,455 B1 | 11/2004 | Macy et al. |
| 6,829,368 B2 | 12/2004 | Meyer et al. |
| 6,834,344 B1 | 12/2004 | Aggarwal et al. |
| 6,834,345 B2 | 12/2004 | Bloom et al. |
| 6,850,626 B2 | 2/2005 | Rhoads et al. |
| 6,856,693 B2 | 2/2005 | Miller |
| 6,880,082 B2 | 4/2005 | Ohta |
| 6,888,943 B1 | 5/2005 | Lam et al. |
| 6,891,958 B2 | 5/2005 | Kirovski et al. |
| 6,912,010 B2 | 6/2005 | Baker et al. |
| 6,912,294 B2 | 6/2005 | Wang et al. |
| 6,912,315 B1 | 6/2005 | Wong et al. |
| 6,915,002 B2 | 7/2005 | Gustafson |
| 6,915,422 B1 | 7/2005 | Nakamura |
| 6,915,481 B1 | 7/2005 | Tewfik et al. |
| 6,931,536 B2 | 8/2005 | Hollar |
| 6,944,313 B1 | 9/2005 | Donescu |
| 6,944,771 B2 | 9/2005 | Epstein |
| 6,947,893 B1 | 9/2005 | Iwaki et al. |
| 6,952,774 B1 | 10/2005 | Kirovski et al. |
| 6,954,541 B2 | 10/2005 | Fan et al. |
| 6,961,854 B2 | 11/2005 | Serret-Avila et al. |
| 6,973,195 B1 | 12/2005 | Matsui |
| 6,993,154 B2 | 1/2006 | Brunk |
| 6,996,249 B2 | 2/2006 | Miller et al. |
| 7,007,166 B1 | 2/2006 | Moskowitz et al. |
| 7,020,304 B2 | 3/2006 | Alattar et al. |
| 7,024,018 B2 | 4/2006 | Petrovic |
| 7,043,049 B2 | 5/2006 | Kuzma |
| 7,043,536 B1 | 5/2006 | Philyaw et al. |
| 7,043,638 B2 | 5/2006 | McGrath et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,815 B2 | 6/2006 | Morin |
| 7,068,809 B2 | 6/2006 | Stach |
| 7,072,492 B2 | 7/2006 | Ogawa et al. |
| 7,107,452 B2 | 9/2006 | Serret-Avila et al. |
| 7,111,169 B2 | 9/2006 | Ripley et al. |
| 7,113,613 B2 | 9/2006 | Echizen et al. |
| 7,142,691 B2 | 11/2006 | Levy |
| 7,162,642 B2 | 1/2007 | Schumann et al. |
| 7,164,778 B1 | 1/2007 | Nakamura et al. |
| 7,167,599 B1 * | 1/2007 | Diehl ................... 382/280 |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |
| 7,231,061 B2 | 6/2007 | Bradley |
| 7,289,643 B2 | 10/2007 | Brunk et al. |

(56) References Cited

U.S. PATENT DOCUMENTS

| | | | |
|---|---|---|---|
| 7,298,865 B2 | 11/2007 | Lubin et al. | |
| 7,319,759 B1 | 1/2008 | Peinado et al. | |
| 7,321,666 B2 | 1/2008 | Kunisa | |
| 7,334,247 B1 | 2/2008 | Finseth et al. | |
| 7,336,802 B2 | 2/2008 | Kunisa | |
| 7,346,514 B2 | 3/2008 | Herre et al. | |
| 7,369,677 B2 * | 5/2008 | Petrovic et al. | 382/100 |
| 7,389,421 B2 | 6/2008 | Kirovski et al. | |
| 7,430,670 B1 | 9/2008 | Horning et al. | |
| 7,450,727 B2 | 11/2008 | Griesinger | |
| 7,454,019 B2 | 11/2008 | Williams | |
| 7,562,392 B1 | 7/2009 | Rhoads et al. | |
| 7,581,103 B2 | 8/2009 | Home et al. | |
| 7,587,601 B2 | 9/2009 | Levy et al. | |
| 7,616,776 B2 | 11/2009 | Petrovic et al. | |
| 7,617,509 B1 | 11/2009 | Brunheroto et al. | |
| 7,630,497 B2 | 12/2009 | Lotspiech et al. | |
| 7,644,282 B2 | 1/2010 | Petrovic et al. | |
| 7,660,991 B2 | 2/2010 | Nakamura et al. | |
| 7,664,332 B2 | 2/2010 | Wong et al. | |
| 7,693,297 B2 | 4/2010 | Zhang et al. | |
| 7,698,570 B2 | 4/2010 | Schumann et al. | |
| 7,788,684 B2 * | 8/2010 | Petrovic et al. | 725/18 |
| 7,788,693 B2 | 8/2010 | Robbins | |
| 7,840,006 B2 | 11/2010 | Ogawa et al. | |
| 7,979,881 B1 | 7/2011 | Wong et al. | |
| 7,983,922 B2 | 7/2011 | Neusinger et al. | |
| 7,986,806 B2 | 7/2011 | Rhoads | |
| 8,055,013 B2 | 11/2011 | Levy et al. | |
| 8,059,815 B2 | 11/2011 | Lofgren et al. | |
| 8,155,463 B2 | 4/2012 | Wong et al. | |
| 8,189,861 B1 | 5/2012 | Rucklidge | |
| 8,194,803 B2 | 6/2012 | Baum et al. | |
| 8,249,992 B2 | 8/2012 | Harkness et al. | |
| 2001/0001159 A1 | 5/2001 | Ford | |
| 2001/0021926 A1 | 9/2001 | Schneck et al. | |
| 2001/0022786 A1 | 9/2001 | King et al. | |
| 2001/0044899 A1 | 11/2001 | Levy | |
| 2001/0051996 A1 | 12/2001 | Cooper et al. | |
| 2002/0007403 A1 | 1/2002 | Echizen et al. | |
| 2002/0012443 A1 | 1/2002 | Rhoads et al. | |
| 2002/0033844 A1 | 3/2002 | Levy et al. | |
| 2002/0044659 A1 | 4/2002 | Ohta | |
| 2002/0052885 A1 | 5/2002 | Levy | |
| 2002/0053026 A1 | 5/2002 | Hashimoto | |
| 2002/0054089 A1 | 5/2002 | Nicholas et al. | |
| 2002/0068987 A1 | 6/2002 | Hars | |
| 2002/0080964 A1 | 6/2002 | Stone et al. | |
| 2002/0080976 A1 | 6/2002 | Schreer | |
| 2002/0082731 A1 | 6/2002 | Pitman et al. | |
| 2002/0095577 A1 | 7/2002 | Nakamura et al. | |
| 2002/0097873 A1 | 7/2002 | Petrovic | |
| 2002/0120849 A1 | 8/2002 | McKinley et al. | |
| 2002/0120854 A1 | 8/2002 | LeVine et al. | |
| 2002/0126842 A1 | 9/2002 | Hollar | |
| 2002/0126872 A1 | 9/2002 | Brunk et al. | |
| 2002/0138734 A1 | 9/2002 | David et al. | |
| 2002/0154144 A1 | 10/2002 | Lofgren et al. | |
| 2002/0168087 A1 | 11/2002 | Petrovic | |
| 2002/0178368 A1 | 11/2002 | Yin et al. | |
| 2003/0009671 A1 | 1/2003 | Yacobi et al. | |
| 2003/0012098 A1 | 1/2003 | Sako et al. | |
| 2003/0012403 A1 | 1/2003 | Rhoads et al. | |
| 2003/0016825 A1 | 1/2003 | Jones | |
| 2003/0021439 A1 | 1/2003 | Lubin et al. | |
| 2003/0021441 A1 | 1/2003 | Levy et al. | |
| 2003/0028796 A1 | 2/2003 | Roberts et al. | |
| 2003/0031317 A1 | 2/2003 | Epstein | |
| 2003/0033321 A1 | 2/2003 | Schrempp et al. | |
| 2003/0037075 A1 | 2/2003 | Hannigan et al. | |
| 2003/0053655 A1 | 3/2003 | Barone et al. | |
| 2003/0056213 A1 | 3/2003 | McFaddin et al. | |
| 2003/0061489 A1 | 3/2003 | Pelly et al. | |
| 2003/0063747 A1 | 4/2003 | Petrovic | |
| 2003/0072468 A1 | 4/2003 | Brunk et al. | |
| 2003/0076955 A1 | 4/2003 | Alve et al. | |
| 2003/0078891 A1 | 4/2003 | Capitant | |
| 2003/0081809 A1 | 5/2003 | Fridrich et al. | |
| 2003/0112974 A1 | 6/2003 | Levy | |
| 2003/0112997 A1 | 6/2003 | Ahmed | |
| 2003/0115504 A1 | 6/2003 | Holliman et al. | |
| 2003/0131350 A1 | 7/2003 | Peiffer et al. | |
| 2003/0152225 A1 | 8/2003 | Kunisa | |
| 2003/0174862 A1 | 9/2003 | Rhoads et al. | |
| 2003/0177359 A1 | 9/2003 | Bradley | |
| 2003/0179901 A1 | 9/2003 | Tian et al. | |
| 2003/0185417 A1 | 10/2003 | Alattar et al. | |
| 2003/0187679 A1 | 10/2003 | Odgers et al. | |
| 2003/0188166 A1 | 10/2003 | Pelly et al. | |
| 2003/0190054 A1 | 10/2003 | Troyansky et al. | |
| 2003/0190055 A1 | 10/2003 | Kalker et al. | |
| 2003/0200438 A1 | 10/2003 | Kirovski et al. | |
| 2003/0223584 A1 | 12/2003 | Bradley et al. | |
| 2004/0005076 A1 | 1/2004 | Hosaka et al. | |
| 2004/0008864 A1 | 1/2004 | Watson et al. | |
| 2004/0009763 A1 | 1/2004 | Stone et al. | |
| 2004/0010692 A1 | 1/2004 | Watson | |
| 2004/0015400 A1 | 1/2004 | Whymark | |
| 2004/0025176 A1 | 2/2004 | Franklin et al. | |
| 2004/0028255 A1 | 2/2004 | Miller | |
| 2004/0042635 A1 | 3/2004 | Epstein et al. | |
| 2004/0042636 A1 | 3/2004 | Oh | |
| 2004/0073916 A1 | 4/2004 | Petrovic et al. | |
| 2004/0078575 A1 | 4/2004 | Morten et al. | |
| 2004/0088556 A1 | 5/2004 | Weirauch | |
| 2004/0091111 A1 | 5/2004 | Levy et al. | |
| 2004/0093523 A1 | 5/2004 | Matsuzaki et al. | |
| 2004/0098593 A1 | 5/2004 | Muratani | |
| 2004/0101160 A1 | 5/2004 | Kunisa | |
| 2004/0103293 A1 | 5/2004 | Ryan | |
| 2004/0111740 A1 | 6/2004 | Seok et al. | |
| 2004/0133794 A1 | 7/2004 | Kocher et al. | |
| 2004/0136531 A1 | 7/2004 | Asano et al. | |
| 2004/0151316 A1 | 8/2004 | Petrovic | |
| 2004/0169581 A1 | 9/2004 | Petrovic et al. | |
| 2004/0174996 A1 | 9/2004 | Tewfik et al. | |
| 2004/0202324 A1 | 10/2004 | Yamaguchi et al. | |
| 2004/0204943 A1 | 10/2004 | Kirovski et al. | |
| 2004/0216157 A1 | 10/2004 | Shain et al. | |
| 2004/0250078 A1 | 12/2004 | Stach et al. | |
| 2004/0258274 A1 | 12/2004 | Brundage et al. | |
| 2005/0008190 A1 | 1/2005 | Levy et al. | |
| 2005/0010779 A1 | 1/2005 | Kobayashi et al. | |
| 2005/0013462 A1 | 1/2005 | Rhoads | |
| 2005/0025332 A1 | 2/2005 | Seroussi | |
| 2005/0050332 A1 | 3/2005 | Serret-Avila et al. | |
| 2005/0071669 A1 | 3/2005 | Medvinsky et al. | |
| 2005/0120220 A1 | 6/2005 | Oostveen et al. | |
| 2005/0154891 A1 | 7/2005 | Skipper | |
| 2005/0196051 A1 | 9/2005 | Wong et al. | |
| 2005/0202781 A1 | 9/2005 | Steelberg et al. | |
| 2005/0242568 A1 | 11/2005 | Long et al. | |
| 2005/0251683 A1 | 11/2005 | Levy et al. | |
| 2006/0005029 A1 | 1/2006 | Petrovic et al. | |
| 2006/0056653 A1 | 3/2006 | Kunisa | |
| 2006/0062426 A1 | 3/2006 | Levy et al. | |
| 2006/0075424 A1 | 4/2006 | Talstra et al. | |
| 2006/0104477 A1 | 5/2006 | Isogai et al. | |
| 2006/0227968 A1 | 10/2006 | Chen et al. | |
| 2006/0239501 A1 | 10/2006 | Petrovic et al. | |
| 2007/0003103 A1 | 1/2007 | Lemma et al. | |
| 2007/0005500 A1 | 1/2007 | Steeves et al. | |
| 2007/0039018 A1 | 2/2007 | Saslow et al. | |
| 2007/0100483 A1 | 5/2007 | Kentish et al. | |
| 2007/0110237 A1 | 5/2007 | Tehranchi et al. | |
| 2007/0143617 A1 | 6/2007 | Farber et al. | |
| 2007/0150418 A1 | 6/2007 | Ben-Menahem et al. | |
| 2007/0168673 A1 | 7/2007 | Van Der Veen et al. | |
| 2007/0177761 A1 | 8/2007 | Levy | |
| 2007/0208711 A1 | 9/2007 | Rhoads et al. | |
| 2007/0223708 A1 | 9/2007 | Villemoes et al. | |
| 2008/0002854 A1 | 1/2008 | Tehranchi et al. | |
| 2008/0016360 A1 | 1/2008 | Rodriguez et al. | |
| 2008/0031463 A1 | 2/2008 | Davis | |

(56) References Cited

U.S. PATENT DOCUMENTS

| | | | |
|---|---|---|---|
| 2008/0209219 A1 | 8/2008 | Rhein | |
| 2008/0228733 A1 | 9/2008 | Davis et al. | |
| 2008/0273861 A1 | 11/2008 | Yang et al. | |
| 2008/0298632 A1 | 12/2008 | Reed | |
| 2008/0310629 A1 | 12/2008 | Van Der Veen et al. | |
| 2008/0310673 A1 | 12/2008 | Petrovic et al. | |
| 2008/0313741 A1 | 12/2008 | Alve et al. | |
| 2009/0031134 A1 | 1/2009 | Levy | |
| 2009/0172405 A1 | 7/2009 | Shiomi et al. | |
| 2009/0177674 A1 | 7/2009 | Yoshida | |
| 2009/0262932 A1 | 10/2009 | Petrovic | |
| 2009/0319639 A1 | 12/2009 | Gao et al. | |
| 2009/0326961 A1 | 12/2009 | Petrovic et al. | |
| 2010/0034513 A1 | 2/2010 | Nakano et al. | |
| 2010/0115267 A1* | 5/2010 | Guo et al. | 713/156 |
| 2010/0121608 A1 | 5/2010 | Tian et al. | |
| 2010/0146286 A1 | 6/2010 | Petrovic et al. | |
| 2010/0162352 A1 | 6/2010 | Haga et al. | |
| 2010/0214307 A1 | 8/2010 | Lee et al. | |
| 2010/0226525 A1 | 9/2010 | Levy et al. | |
| 2010/0228632 A1 | 9/2010 | Rodriguez | |
| 2010/0228857 A1 | 9/2010 | Petrovic et al. | |
| 2010/0287579 A1 | 11/2010 | Petrovic et al. | |
| 2010/0287609 A1 | 11/2010 | Gonzalez et al. | |
| 2011/0016172 A1 | 1/2011 | Shah | |
| 2011/0068898 A1 | 3/2011 | Petrovic et al. | |
| 2011/0091066 A1 | 4/2011 | Alattar | |
| 2011/0103444 A1 | 5/2011 | Baum et al. | |
| 2011/0123063 A1 | 5/2011 | Delp et al. | |
| 2011/0202687 A1 | 8/2011 | Glitsch et al. | |
| 2011/0209191 A1 | 8/2011 | Shah | |
| 2011/0219229 A1 | 9/2011 | Cholas et al. | |
| 2011/0225427 A1 | 9/2011 | Wood et al. | |
| 2011/0235908 A1* | 9/2011 | Ke et al. | 382/173 |
| 2011/0286625 A1 | 11/2011 | Petrovic et al. | |
| 2011/0293090 A1 | 12/2011 | Ayaki et al. | |
| 2011/0311056 A1 | 12/2011 | Winograd | |
| 2012/0017091 A1 | 1/2012 | Petrovic et al. | |
| 2012/0026393 A1 | 2/2012 | Petrovic et al. | |
| 2012/0072729 A1 | 3/2012 | Winograd et al. | |
| 2012/0072730 A1 | 3/2012 | Winograd et al. | |
| 2012/0072731 A1 | 3/2012 | Winograd et al. | |
| 2012/0084870 A1 | 4/2012 | Petrovic | |
| 2012/0130719 A1 | 5/2012 | Petrovic et al. | |
| 2012/0203556 A1 | 8/2012 | Villette et al. | |
| 2012/0300977 A1 | 11/2012 | Petrovic et al. | |
| 2013/0007462 A1 | 1/2013 | Petrovic et al. | |
| 2013/0011006 A1 | 1/2013 | Petrovic et al. | |
| 2013/0073065 A1 | 3/2013 | Chen et al. | |
| 2013/0108101 A1 | 5/2013 | Petrovic et al. | |
| 2013/0114847 A1 | 5/2013 | Petrovic et al. | |
| 2013/0114848 A1 | 5/2013 | Petrovic et al. | |
| 2013/0117570 A1 | 5/2013 | Petrovic et al. | |
| 2013/0117571 A1 | 5/2013 | Petrovic et al. | |
| 2013/0142382 A1 | 6/2013 | Petrovic et al. | |
| 2013/0151855 A1 | 6/2013 | Petrovic et al. | |
| 2013/0151856 A1 | 6/2013 | Petrovic et al. | |
| 2013/0152210 A1 | 6/2013 | Petrovic et al. | |

FOREIGN PATENT DOCUMENTS

| | | |
|---|---|---|
| EP | 372601 A1 | 6/1990 |
| EP | 581317 A2 | 2/1994 |
| EP | 2166725 | 3/2010 |
| GB | 2260246 A | 4/1993 |
| GB | 2292506 A | 2/1996 |
| GB | 2363027 A | 12/2001 |
| JP | 10-150548 A | 6/1998 |
| JP | 11-086435 A | 3/1999 |
| JP | 11-284516 A | 10/1999 |
| JP | 11-346302 A | 12/1999 |
| JP | 2000-069273 A | 3/2000 |
| JP | 2000083159 A | 3/2000 |
| JP | 2000-174628 A | 6/2000 |
| JP | 2000163870 | 6/2000 |
| JP | 2000216981 A | 8/2000 |
| JP | 2001022366 A | 1/2001 |
| JP | 2001-119555 A | 4/2001 |
| JP | 2001175270 A | 6/2001 |
| JP | 2001-188549 A | 7/2001 |
| JP | 2001-216763 A | 8/2001 |
| JP | 2001-218006 A | 8/2001 |
| JP | 2001245132 | 9/2001 |
| JP | 2001-312570 A | 11/2001 |
| JP | 2001-527660 A | 12/2001 |
| JP | 2002-010057 A | 1/2002 |
| JP | 2002-024095 A | 1/2002 |
| JP | 2002-027223 A | 1/2002 |
| JP | 2002-091465 A | 3/2002 |
| JP | 2002091712 | 3/2002 |
| JP | 2002100116 | 4/2002 |
| JP | 2002125205 | 4/2002 |
| JP | 2002-135557 A | 5/2002 |
| JP | 2002-165191 A | 6/2002 |
| JP | 2002176614 | 6/2002 |
| JP | 2002-519916 A | 7/2002 |
| JP | 2002-232693 A | 8/2002 |
| JP | 2002232412 A | 8/2002 |
| JP | 2002319924 | 10/2002 |
| JP | 2002354232 | 12/2002 |
| JP | 2003-008873 A | 1/2003 |
| JP | 2003-039770 A | 2/2003 |
| JP | 2003-091927 A | 3/2003 |
| JP | 2003-230095 A | 8/2003 |
| JP | 2003-244419 A | 8/2003 |
| JP | 2003-283802 A | 10/2003 |
| JP | 2003316556 | 11/2003 |
| JP | 2004-023786 A | 1/2004 |
| JP | 2004070606 | 3/2004 |
| JP | 2004-163855 A | 6/2004 |
| JP | 2004-173237 A | 6/2004 |
| JP | 2004-193843 A | 7/2004 |
| JP | 2004194233 | 7/2004 |
| JP | 2004-328747 A | 11/2004 |
| JP | 2005051733 | 2/2005 |
| JP | 2005-094107 A | 4/2005 |
| JP | 2005525600 A | 8/2005 |
| JP | 20080539669 | 11/2008 |
| JP | 20100272920 | 12/2010 |
| KR | 20100009384 | 1/2010 |
| WO | 94-10771 | 5/1994 |
| WO | 95-14289 | 5/1995 |
| WO | 97-09797 | 3/1997 |
| WO | 97-33391 | 9/1997 |
| WO | 98-53565 | 11/1998 |
| WO | 99-03340 | 1/1999 |
| WO | 99-39344 | 5/1999 |
| WO | 99-45706 | 10/1999 |
| WO | 99-62022 | 12/1999 |
| WO | 00-00969 | 1/2000 |
| WO | 00-13136 | 3/2000 |
| WO | 00-56059 | 9/2000 |
| WO | 01-54035 | 7/2001 |
| WO | 01-55889 | 8/2001 |
| WO | 0197128 A1 | 12/2001 |
| WO | 0219589 | 3/2002 |
| WO | 0223883 A2 | 3/2002 |
| WO | 02095727 | 11/2002 |
| WO | 03052598 A2 | 6/2003 |
| WO | 2005017827 | 2/2005 |
| WO | 2005-027501 | 3/2005 |
| WO | 2006051043 | 5/2006 |
| WO | 2006051043 A1 | 5/2006 |
| WO | 2006116394 | 11/2006 |
| WO | 2006116394 A2 | 11/2006 |
| WO | 2010073236 | 7/2010 |
| WO | 2010073236 A1 | 7/2010 |
| WO | 2013067439 | 5/2013 |

(56) References Cited

FOREIGN PATENT DOCUMENTS

| WO | 2013090462 | 6/2013 |
|----|------------|--------|
| WO | 2013090466 | 6/2013 |
| WO | 2013090467 | 6/2013 |

OTHER PUBLICATIONS

Kuznetsov, A.V., et al., "An error correcting scheme for defective memory," IEEE Trans. Inf. Theory, 6(4):712-718, Nov. 1978 (7 pages).

Lacy, J., et al., "Intellectual property protection systems and digital watermarking," Proceedings: Information Hiding, Second International Workshop, Portland, Oregon, pp. 158-168, 1998.

Lin, E.T., et al., "Detection of image alterations using semi-fragile watermarks," Proceedings of the SPIE International Conference on Security and Watermarking of Multimedia Contents II, Jan. 2000 (12 pages).

Lin, P.L, et al., "Robust transparent image watermarking system with spatial mechanisms," The Journal of Systems and Software, 50:107-116, Feb. 2000.

Lotspeich, J., "The Advanced Access Content System's Use of Digital Watermarking," MCPS '06, Oct. 28, 2006, pp. 19-21.

Lu, C.S., et al., "Oblivious cocktail watermarking by sparse code shrinkage: A regional-and global-based scheme," IEEE Transactions on Multimedia, 4(2):209-224, Dec. 2000.

Maehara, F., et al., "A proposal of multimedial home education terminal system based on flash-squeak OS," Technical report of the institute of image information and television engineers, 28(43):21-24, Jul. 2004.

Mason, A. J., et al., "User requirements for watermarking in broadcast applications," IEEE Conference Publication, International Broadcasting Convention (BC 2000), Amsterdam, Sep. 8-12, 2000 (7 pages).

Mintzer, F., et al., "If one watermark is good, are more better?," Acoustics, Speech, and Signal Processing, ICASSP, 4:2067-2069, Mar. 1999.

Mobasseri, B.G., et al. "Content authentication and tamper detection in digital video," Image Processing Proceedings, International Conference, 1:458-461, 2000.

Moulin, P., et al., "Detection-theoretic analysis of desynchronization attacks in watermarking," Technical Report MSR-TR-2002-24, Microsoft Corporation, Mar. 2002.

Muranoi, R., et al., "Video retrieval method using shotID for copyright protection systems," Proc. SPIE Multimedia Storage and Archiving Systems III, 3527:245-252, Nov. 1998.

Nikolaidis, N., et al., "Watermark detection: benchmarking perspectives," 2002 IEEE Conference on Multimedia and Expo, 2002 (4 pages).

Office Action dated Mar. 18, 2011 for European Patent Application No. 03774648.4 (6 pages).

Office Action dated Mar. 16, 2012 for Japanese Patent Application No. 2008-508985 (17 pages).

Office Action dated May 8, 2012 for Japanese Patent Application No. 2009-522802 (4 pages).

Park, J.H., et al., "Robust and fragile watermarking techniques for documents using bidirectional diagonal profiles," Information and Communications Security: Third International Conference, Xian, China, Nov. 2001, pp. 483-494.

Perez-Gonzalez, F., et al., "Approaching the capacity limit in image watermarking a perspective on coding techniques for data hiding applications," Signal Processing, 6(81):1215-1238 Jun. 2001.

Petitcolas, F., et al., "The blind pattern matching attack on watermark systems," IEEE Trans. Signal Processing, Apr. 2003 (4 pages).

Petitcolas, F.A.P., et al., "Attacks on copyright marking systems," Second Workshop on Information Hiding, Lecture Notes in Computer Science, Portland, Oregon, pp. 218-238, Apr. 1998.

Philips Research Liquid Audio Fraunhofer Institute, "Digital Audio Screening Technology for Phased Rollout," Version 1.00, May 1999 (38 pages).

Pytlak, J.,"Anti-piracy coding," URL: http://www.tele.com/pipermail/tig/2003-November/003842.html; Nov. 2003 (2 pages).

RSA Laboratories, "Frequently asked questions about today's cryptography," Version 4.1, May 2000 (37 pages).

Schneier, B., "Applied cryptography, second edition: protocols, algorithms and source code in C," Oct. 1995 (10 pages).

Shih, F.Y., et al., "Combinational, image watermarking in the spatial and frequency domains," Pattern Recognition, 36:696-975, May 2002.

Solanki, K., et al., "Robust image-adaptive data hiding: modeling, source coding and channel coding," 41st Allerton Conference on Communications, Control and Computing, Oct. 2003 (10 pages).

Steinebach, M., et al., "StirMark benchmark: audio watermarking attacks," International Conference on Information Technology: Coding and Computing (ITCC 2001), Las Vegas, Nevada, Apr. 2001 (6 pages).

Tanaka, K., et al., "Secret transmission method of character data in motion picture communication," SPIE Visual Communications and Image Processing '91, 1605:646-649, 1991.

Tsai, M.J., et al., "Wavelet packet and adaptive spatial transformation of watermark for digital image authentication," IEEE Image Processing, 2000 International Conference, 1:450-453, 2000 (4 pages).

Verance Corporation, "Confirmedia," PowerPoint presentation made to National Association of Broadcasters; Apr. 24, 2001 (40 pages).

Xu, C., et al., "Applications of digital watermarking technology in audio signals," Journal of Audio Eng. Soc., 10(47):805-812, Oct. 1999.

Yeung, M. M., et al., "An invisible watermarking technique for image verification," Image Processing, International Conference Proceedings, 2:680-683, Oct. 26-29, 1997.

Zhao, J., "A WWW service to embed and prove digital copyright watermarks," Proc. European Conf. on Multimedia Applications, Services and Techniques (ECMAST'96), May 1996 (15 pages).

Zhao, J., "Applying digital watermarking techniques to online multimedia commerce," Proc. Int. Conf. on Imaging Science, Systems and Applications (CISSA'97), Jun./Jul. 1997 (7 pages).

"Advanced Access Content System (AACS), Pre-recorded Video Book," Revision 0.951, Sep. 2009 (88 pages).

"Microsoft response to CfP for technology solutions to screen digital audio content for LCM acceptance," Microsoft Corporation, May 23, 1999.

"TASK AC122-copy protection for distribution services," Http://acad.bg/WISE/english/rd/partners/acts/areal/ac122-t.html, Jul. 1, 1997.

Adelsbach, A., et al., "Proving Ownership of Digital Content," Proc. 3rd Int. Workshop on Information Hiding, 1768:117-133, Sep. 1999.

Aggarwal, A., et al., "Multi-Layer Grid Embeddings," Foundations of Computer Science, 26th Annual Symposium on Foundations of Computer Science, 85:186-196, Oct. 1985.

Aris Technologies, Inc. "Audio Watermarking System to Screen Digital Audio Content for LCM Acceptance," May 1999 (17 pages).

Barreto, P.S.L.M., et al. "Toward Secure Public-Key Blockwise Fragile Authentication Watermarking," IEEE Proceedings Vision, Image, and Signal Processing, 149(2):57-62, Apr. 2002.

Boney, L., et al., "Digital Watermarks for Audio Signals," Dept. of Electrical Engineering, Univ. of Minnesota, Mar. 1996 (4 pages).

Cappellini, V., et al. "Robust Frame-based Watermarking for Digital Video," Proceedings of the 12th International Workshop on Database and Expert Systems Applications, Sep. 2001 (5 pages).

Caronni, G., "Assuring Ownership Rights for Digital Images," Proceedings of reliable IT systems VIS 95, Vieweg Publishing Company, Germany, 1995 (10 pages).

Chen, B., et al., "Quantization index modulation: a class of provably good methods for digital watermarking and information embedding," IEEE Transactions on Information Theory, 47(4):1423-1443 May 2001.

Chou, J., et al., "A Robust Blind Watermarking Scheme based on Distributed Source Coding Principles", Multimedial 2000 Proceedings of the eighth ACM international conference on multimedia, Los Angeles, California, 2000 (8 pages).

Chou, J., et al., "A Robust Optimization Solution to the Data Hiding Problem using Distributed Source Coding Principles," Pro. SPIE, 3971, San Jose, California, Jan. 2000 (10 pages).

(56) References Cited

OTHER PUBLICATIONS

Cinea, Inc., "Forensic watermarking deterring video piracy," 2004, (9 pages). [http://www.cinea.com/whitepapers/forensic_watermarking.pdf].

Costa, M., "Writing on Dirty Paper," IEEE Trans. on Info. Theory, 29(3):439-441, May 1983.

Cox, I. J., et al., "Some general methods for tampering with watermarks," IEEE Journal on Selected Areas in Communications, 16(4): 587-593, May 1998.

Davidson, M.F., "Music File Filter," Sony Music, New York, May 23, 1999 (2 pages).

Digimarc Corporation, "Digimarc Watermarking Guide," 1999 (22 pages).

Dittmann, J., "Combining digital watermarks and collusion secure fingerprints for customer copy monitoring," Proc. IEEE Seminar on Secure Images and Image Authentication, Apr. 2000 (6 pages).

Dittmann, J., et al., "Combining digital watermarks and collusion secure fingerprints for digital images," Proc. SPIE 3657:171-182, Jan. 1999.

European Search Report dated Nov. 10, 2010 for European Patent Application No. 03774648.4, filed Oct. 7, 2003 (5 pages).

European Search Report dated Apr. 12, 2012 for European Patent Application No. 07836262.1 filed Jul. 25, 2007 (12 pages).

Furon, T., et al., "An asymmetric watermarking method," IEEE Trans. Signal Processing, 4(51):981-995, Apr. 2003.

Guth, H.J. et al., "Error-and collusion-secure fingerprinting for digital data," Proc. 3rd Int. Workshop on Information Hiding, LNCS 1768:134-145, Sep./Oct. 1999.

Hartung, F., et al., "Digital watermarking of MPEG-2 coded video in the bitstream domain," Proc. IEEE Int. Conf. on Acoustics, Speech and Signal Processing, 4:2621-2624, Apr. 1997.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

Heegard, C., et al., "On the capacity of computer memory with defects," IEEE Trans. Info. Theory, 5(IT-29):731-739, Sep. 1983.

International Search Report and Written Opinion dated Aug. 14, 1998 for International Application No. PCT/US1998/009587, filed May 12, 1998 (3 pages).

International Search Report and Written Opinion dated Aug. 22, 2007 for International Application No. PCT/US2006/031267, filed Aug. 9, 2006 (2 pages).

International Search Report and Written Opinion dated Feb. 14, 2002 for International Application No. PCT/US2001/026505, filed Aug. 27, 2001 (2 pages).

International Search Report and Written Opinion dated Jan. 4, 2008 for International Application No. PCT/US2006/015615, filed Apr. 25, 2006 (5 pages).

International Search Report and Written Opinion dated Mar. 28, 2012 for International Application No. PCT/US2011/051855, filed Sep. 15, 2011 (8 pages).

International Search Report and Written Opinion dated May 13, 2008 for International Application No. PCT/US2006/025090, filed Jun. 27, 2006 (2 pages).

International Search Report and Written Opinion dated May 19, 2004 for International Application No. PCT/US2003/031816, filed Apr. 29, 2004 (3 pages).

International Search Report and Written Opinion dated May 29, 2008 for International Application No. PCT/US2006/015410, filed Apr. 21, 2006 (6 pages).

International Search Report and Written Opinion dated Sep. 26, 2008 for International Application No. PCT/US2007/016812, filed Jul. 25, 2007 (6 pages).

International Search Report and Written Opinion dated Apr. 24, 2012 for International Application No. PCT/US2011/051857, filed Sep. 15, 2011 (9 pages).

Jacobsmeyer, J., et al., "Introduction to error-control coding," Pericle Communications Company, 2004 (16 pages).

Kalker, T., et al., "A security risk for publicly available watermark detectors," Proc. Benelux Info. Theory Symp., Veldhoven, The Netherlands, May 1998.

Kalker, T., et al., "System issues in digital image and video watermarking for copy protection," Proc. IEEE Int. Conf. on Multimedia Computing and Systems, pp. 562-567, Jun. 1999.

Kang, X., et al., "A DWT-DFT composite watermarking scheme robust to both affine transform and JPEG compression," IEEE Transactions on Circuits and Systems for Video Technology, 8(13):776-786 Aug. 2003.

Kim, T.Y., et al., "An asymmetric watermarking system with many embedding watermarks corresponding to one detection watermark," IEEE Signal Processing Letters, 3(11):375-377, Mar. 2004.

Kirovski, D., et al., "Multimedia content screening using a dual watermarking and fingerprinting system," Proceedings of the tenth ACM international conference, pp. 372-381, 2002.

Kirovski, D., et al., "Randomizing the replacement attack," ICASSP, pp. 381-384, 2004.

Kirovski, D., et al., "Multimedia content screening using a dual watermarking and fingerprinting system," Multimedia '02 Proceedings of the tenth ACM international conference on Multimedia, 2002 (11 pages).

Kocher, P., et al., "Self-Protecting Digital Content: A Technical Report from the CRI Content Security Research Initiative," Cryptography Research, Inc. (CRI), 2002-2003 (14 pages).

International Search Report and Written Opinion dated Feb. 28, 2013 for International Application No. PCT/US2012/066138, filed Nov. 20, 2012 (11 pages).

"Content Protection—Self Protecting Digital Content," http://www.cryptography.com/technology/spdc/index.html, May 2010 (1 page).

Bangaleea, R., et al., "Performance improvement of spread spectrum spatial-domain watermarking scheme through diversity and attack characterisation," IEEE Africon, pp. 293-298, 2002.

Coxford, A., et al., "Advanced Mathematics: A Preparation for Calculus, Second Edition," Harcourt Brace Jovanovish, Inc., 1978 (14 pages).

Das, et al., "Distributed Priority Queues on Hybercube Architectures," IEEE, 1996, pp. 620-627.

Epp, L.W., et al., "Generalized scattering matrices for unit cell characterization of grid amplifiers and device de-embedding," IEEE, 2:1288-1291, Jun. 1995.

European Search Report dated Jul. 3, 2012 for European Patent Application No. 12150742.0, filed Oct. 7, 2003 (5 pages).

European Search Report dated Oct. 24, 2012 for European Patent Application No. 06758537.2, filed Apr. 21, 2006 (6 pages).

European Search Report dated Oct. 31, 2012 for European Patent Application No. 06758577.8, filed Apr. 25, 2006 (6 pages).

European Search Report dated Nov. 8, 2012 for European Patent Application No. 06785709.4, filed Jun. 27, 2006 (5 pages).

International Search Report and Written Opinion dated Apr. 8, 2013 for International Application No. PCT/US2012/069306, filed Dec. 12, 2012 (12 pages).

International Search Report and Written Opinion dated Mar. 25, 2013 for International Application No. PCT/US2012/069302, filed Dec. 12, 2012 (22 pages).

International Search Report and Written Opinion dated Mar. 14, 2013 for International Application No. PCT/US2012/069308, filed Dec. 12, 2012 (10 pages).

International Search Report and Written Opinion dated Mar. 18, 2013 for International Application No. PCT/US2012/063431, filed Nov. 2, 2012 (10 pages).

Kirovski, D., et al., "Robust spread-spectrum audio watermarking," IEEE International Conference on Acoustics, Speech, and Signal Processing, 3:1345-1348, 2001.

Office Action dated Jul. 21, 2011 for Japanese Patent Application No. 2008-508985 (6 pages).

(56) References Cited

OTHER PUBLICATIONS

Office Action dated Nov. 26, 2012 for Japanese Patent Application No. 2011-114667 (8 pages).
Office Action dated May 1, 2013 for Japanese Patent Application No. 2011-114667 (6 pages).
Office Action dated Nov. 28, 2012 for Japanese Patent Application No. 2011-114666 (8 pages).
Seok, J., et al., "A novel audio watermarking algorithm for copyright protection of digital audio," ETRI Journal, 24(3):181-189, Jun. 2002.
Wolfgang, R., et al., "Perceptual watermarks for digital images and video," Proceedings of the IEEE, 87(7):1108-1126, Jul. 1999.

* cited by examiner

ENHANCED CONTENT MANAGEMENT BASED ON WATERMARK EXTRACTION RECORDS

FIELD OF INVENTION

The present application generally relates to the field of content management. More particularly, the disclosed embodiments relate to using extraction records associated with a media content to carry out content management.

BACKGROUND

This section is intended to provide a background or context to the disclosed embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Watermarks are substantially imperceptible signals embedded into a host content. The host content may be any one of audio, still image, video or any other content that may be stored on a physical medium or transmitted or broadcast from one point to another. Watermarks are designed to carry auxiliary information without substantially affecting fidelity of the host content, or without interfering with normal usage of the host content. For this reason, watermarks are sometimes used to carry out covert communications, where the emphasis is on hiding the very presence of the hidden signals. In addition, other widespread applications of watermarks include prevention of unauthorized usage (e.g., duplication, playing and dissemination) of copyrighted multi-media content, proof of ownership, authentication, tampering detection, content integrity verification, broadcast monitoring, transaction tracking, audience measurement, triggering of secondary activities such as interacting with software programs or hardware components, communicating auxiliary information about the content such as caption text, full title and artist name, or instructions on how to purchase the content, and the like. The above list of applications is not intended to be exhaustive, as many other present and future systems can benefit from co-channel transmission of main and auxiliary information.

Designing a watermarking system requires reaching the proper balance between transparency (imperceptibility) of embedded watermarks, robustness of embedded watermarks (i.e., the watermark's ability to withstand intentional and unintentional signal distortions) and security requirements of the system (i.e., the extent to which embedded watermarks can evade detection, deletion and/or manipulation by unauthorized parties). Such a balancing act must be carried out while limiting the average and/or maximum number of processing operations (i.e., the processing load) and memory usage below particular levels that are often imposed for practical software and/or hardware implementations of watermark embedder and/or a watermark extractor. The reduction of processing load is particularly important when devices with limited processing, memory and/or battery resources receive media content that must be evaluated to determine the copyright status of the received content based on the watermarks that are embedded therein.

SUMMARY

This section is intended to provide a summary of certain exemplary embodiments and is not intended to limit the scope of the embodiments that are disclosed in this application.

The disclosed embodiments relate to devices, methods and systems that facilitate evaluation of received content that are subject to watermark screening obligation in an efficient and secure manner, while enhancing the content user's experience. One aspect of the disclosed embodiments relates to a method that includes receiving, at a content handling device, a content subject to a content screening obligation, accessing a watermark extraction record associated with the received content to determine whether the watermark extraction record comprises permissive information or restrictive information. Upon a determination that the watermark extraction record comprises permissive information, the method further includes verifying the watermark extraction record based on a verification rate, where the verifying comprises conducting watermark extraction operations for extracting at least one embedded watermark from the received content to assess validity of the permissive information. If the verifying is successful, the method further includes allowing access to the received content.

In one embodiment, the verification rate is representative of how frequently the watermark extraction record is to be verified, and the verification rate is decreased subsequent to the successful verifying. In one variation, the verification rate is selected to effect random verification of the extraction record according to a probability value. In one embodiment, the permissive information is indicative of allowing unrestricted access to the received content, while in another embodiment, the watermark verification operations result in extraction of at least one copy control watermark, and the validity of the permissive information is assessed by comparing a copy control state of the extracted copy control watermark to a copy control state of the extraction record.

According to one embodiment, the above noted method further comprises, if the verifying is unsuccessful, effecting access to the received content in conformance with a content use policy associated with the extracted watermark(s). In one exemplary embodiment, where the verification rate is representative of how frequently the verifying of the watermark extraction record is to be carried out, the verification rate is increased subsequent to the unsuccessful verifying. In yet another embodiment, upon determination that the watermark extraction record comprises restrictive information, the above noted method includes effecting access to the received content in conformance with a content use policy associated with the extraction record, and increasing the verification rate.

In one embodiment, upon determination that the watermark extraction record comprises restrictive information, the above noted method includes verifying the watermark extraction record based on the verification rate, where the verifying comprises conducting watermark extraction operations for extracting at least one embedded watermark from the received content to assess validity of the restrictive information. If the verification of the restrictive information is successful, the method also includes effecting access to the received content in conformance with a content use policy associated with the extraction record, and increasing the verification rate. In still another embodiment, the above noted method further includes, if the verification of the restrictive information is not successful, effecting access to the content in conformance with a content use policy associated with the extracted watermark(s), and increasing the verification rate. In one exemplary embodiment, where the method further includes providing a notification to a user of the content handling device indicative of an unauthorized content access.

According to one embodiment, accessing the extraction record comprises transmitting a request for the extraction record, where the request comprising content identification information associated with the received content, and receiving the extraction record. In one exemplary embodiment, the content identification information comprises a hash value, a content name and a content size. In such and embodiment, the content identification information can include one or more hash values that are calculated based on one or more segments of the received content, and at least one of a number of segments, an extent of each segment, and a location of each segment within the received content is selected pseudo-randomly.

In yet another embodiment, where upon receiving the content, the extraction record can not be located, content screening operations are conducted based on a particular screening rate, where the content screening operations comprise watermark extraction operations for extracting one or more watermarks. In such an embodiment, access to the received content is effected in conformance with a content use policy associated with the extracted watermarks, and an extraction record is saved including results of the content screening operations. In one exemplary embodiment, the screening rate is representative of how often content without extraction records received by the content handling device is to be subjected to content screening operations, and the screening rate is increased upon determination that a first extraction record received by the content handling device and associated with a first content contains permissive or restrictive information that is contrary to content access information associated with watermarks embedded in the first content. In another exemplary embodiment, the screening rate is decreased upon determination that a second extraction record received by the content handling device and associated with a second content contains permissive information that is consistent with content access information associated with watermarks embedded in the second content.

Another aspect of the disclosed embodiments relates to a method that includes receiving, at a content handling device, a content subject to a content screening obligation, accessing a watermark extraction record associated with the received content, verifying the watermark extraction record based on a verification rate, where the verifying comprising conducting watermark extraction operations for extracting at least one embedded watermark from the received content to assess validity of the extraction record. Such a method, if the verifying is successful, also includes effecting access to the received content in conformance with content use policy associated with the watermark extraction record.

Another aspect of the disclosed embodiments relates to a method that includes receiving, at a content handling device, a streaming content subject to a content screening obligation, allowing access to the received streaming content for a duration of a grace interval, selecting at least one segment of the streaming content during the grace interval, calculating one or more hash value(s) for the selected segment(s), requesting a watermark extraction record, the request comprising the calculated hash value(s), and if the extraction record is not received within the grace interval, allowing access to the received streaming content for an extended grace interval if the extended grace interval duration is within a grace interval extension limit.

In one exemplary embodiment, the extraction record is not received within the grace interval, the extended grace interval duration exceeds the grace interval extension limit, and the content handling device commences content screening operations comprising watermark extraction operations for extracting one or more watermarks from the received streaming content. In another exemplary embodiment, such a method further includes allowing access to the received streaming content for a duration of an initial access period spanning an initial portion of the received streaming content. In yet another exemplary embodiment, the hash value is calculated for a content segment that spans an entire duration of the grace interval.

Another aspect of the disclosed embodiments relates to a method that includes, at a receiver device at a database, receiving a request for a service, the request comprising a plurality of hash values calculated based on a plurality of segments of a content, comparing the plurality of received hash values to a plurality of hash values associated with a record stored at the database, and if a match is found between at least a fraction of the plurality of received hash values and the plurality of hash values associated with the record, transmitting, using a transmitter device, the requested service to a requesting entity. In one exemplary embodiment, the request further comprises a content name and a content size. In such an exemplary embodiment, the comparing comprises comparing the content name to a content name associated with the record stored at the database, and if a match is obtained, comparing the content size to a content size associated with the record stored at the database, and only if a match is obtained, then comparing the plurality of received hash values to the plurality of hash values associated with the record stored at the database.

Another aspect of the disclosed embodiments relates to a device that includes a processor, and a memory comprising processor executable code. The processor executable code, when executed by the processor, configures the device to receive a content subject to a content screening obligation, access a watermark extraction record associated with the received content, and determine whether the watermark extraction record comprises permissive information or restrictive information. Upon determination that the watermark extraction record comprises permissive information, the processor executable code, when executed by the processor, also configures the device to verify the watermark extraction record based on a verification rate, where the verifying includes conducting watermark extraction operations for extracting at least one embedded watermark from the received content to assess validity of the extraction record. If the verification of the watermark extraction record is successful, the processor executable code, when executed by the processor, configures the device to allow access to the received content.

Another aspect of the disclosed embodiments relate to a device that includes a processor and a memory that includes processor executable code. The processor executable code, when executed by the processor, configures the device to receive a content subject to a content screening obligation, access a watermark extraction record associated with the received content to determine whether the watermark extraction record comprises permissive information or restrictive information. Upon determination that the watermark extraction record comprises permissive information, the processor executable code, when executed by the processor, also configures the device to verify the watermark extraction record based on a verification rate, where the verifying includes conducting watermark extraction operations for extracting at least one embedded watermark from the received content to assess validity of the permissive information. If the verification of the extraction record is successful, the processor executable code, when executed by the processor, configures the device to allow access to the content.

Another aspect of the disclosed embodiments relates to a computer program product, embodied on a non-transitory computer readable medium, that includes program code for receiving, at a content handling device, a content subject to a content screening obligation, program code for accessing a watermark extraction record associated with the received content to determine whether the watermark extraction record comprises permissive information or restrictive information. Upon determination that the watermark extraction record comprises permissive information, the program product also includes program code for verifying the watermark extraction record based on a verification rate, where the verifying comprises conducting watermark extraction operations for extracting at least one embedded watermark from the received content to assess validity of the permissive information; and if the verifying is successful. The computer program product further includes program code for allowing access to the received content.

Another aspect of the disclosed embodiments relates to a device that includes a receiver configured to receive a content subject to a content screening obligation, an extraction record processing component configured to access a watermark extraction record associated with the received content and to determine whether the watermark extraction record comprises permissive information or restrictive information. The device also includes a watermark extractor configured to conduct watermark extraction operations for extracting at least one embedded watermark from the received content in response to the extraction record processing component's determination that is indicative of presence of permissive information. In such a device, the extraction record processing component is further configured to verify the extraction record based on a verification rate by assessing validity of the permissive information using the extracted watermark(s), and, if the validity of the permissive information is confirmed, to produce an indication that access to the received content is allowed.

Another aspect of the disclosed embodiments relates to a device that includes a receiver configured to receive a streaming content subject to a content screening obligation, and a processing component configured to produce an indication that access to the received streaming content is allowed for a duration of a grace interval, select at least one segment of the streaming content during the grace interval, and calculate one or more hash value(s) for the selected segment(s). The processing component is further configured to request a watermark extraction record, where the request comprises the calculated hash value(s), and if the extraction record is not received within the grace interval, determine if a grace interval extension limit has been reached, and if a grace interval extension limit has not been reached produce an indication that access to the received streaming content is allowed for an extended grace interval.

Another aspect of the disclosed embodiments relates to a device that includes a receiver configured to receive a request for a service at a database, where the request comprises a plurality of hash values calculated based on a plurality of segments of a content. The device also includes a processing component configured to compare the plurality of received hash values to a plurality of hash values associated with a record stored at the database, and a transmitter configured to transmit the requested service to a requesting entity in response to a determination of the processing component that a match is found between at least a fraction of the plurality of received hash values and the plurality of hash values associated with the record.

DETAILED DESCRIPTION OF CERTAIN EMBODIMENTS

Figure 1:
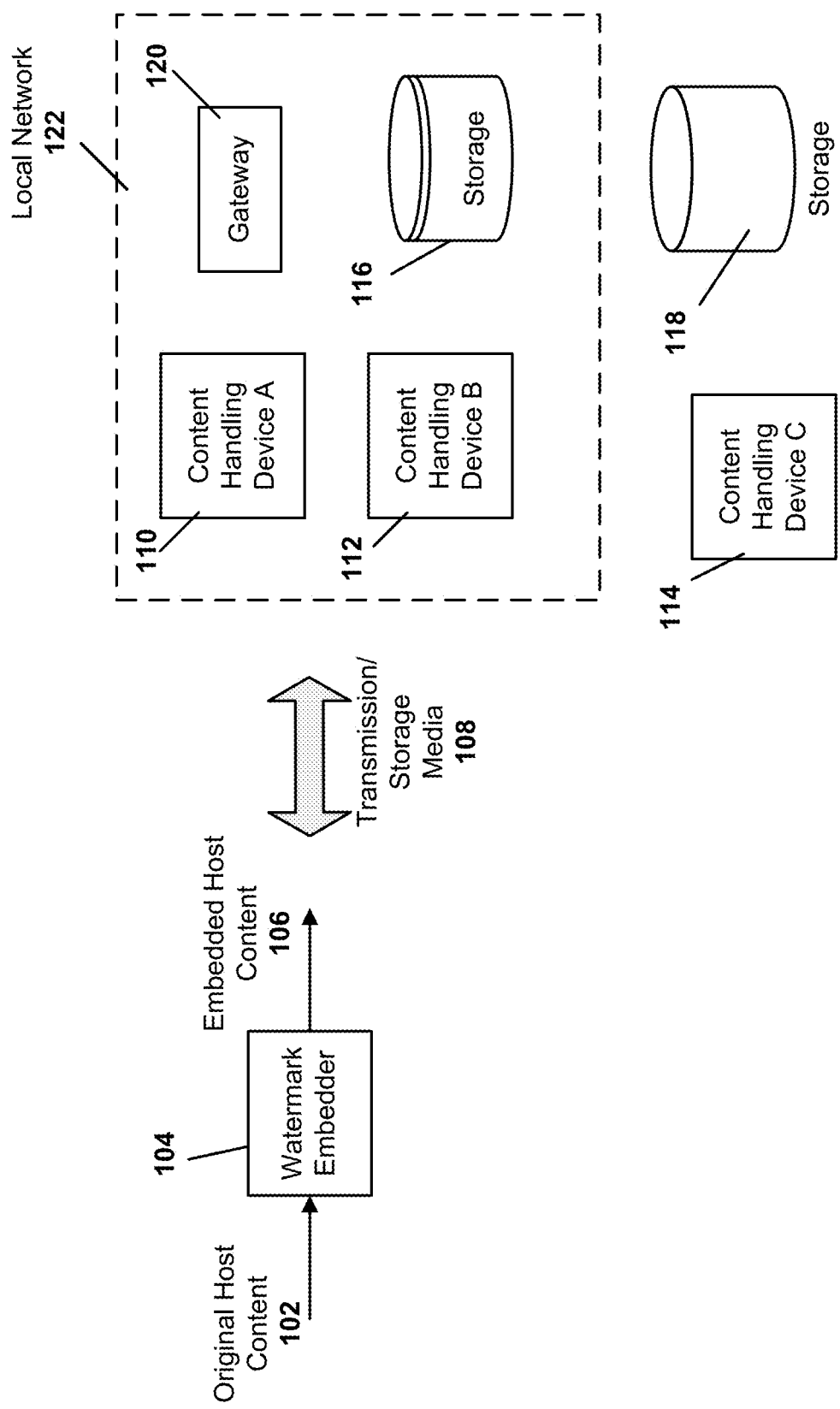
FIG. 1 is a block diagram of a watermarking system that can accommodate the disclosed embodiments.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Watermarks can be embedded into a host content using a variety of watermark embedding techniques by, for example, manipulating the least significant bits of the host signal in time or frequency domains, insertion of watermarks with an independent carrier signal using spread spectrum, phase, amplitude or frequency modulation techniques, and insertion of watermarks using a host-dependent carrier signal such as feature modulation and informed-embedding techniques. Most embedding techniques utilize psycho-visual or psycho-acoustical (or both) analysis of the host content to determine optimal locations and amplitudes for the insertion of watermarks. This analysis typically identifies the degree to which the host signal can hide or mask the embedded watermarks as perceived by humans.

An embedded host content is often stored and/or transmitted to another location using a variety of storage and/or transmission channels. These channels are characterized by inherent noise and distortions, such as errors due to scratches and fingerprints that contaminate data on optical media, noise in over-the-air broadcasts of audio-visual content, packet drops in streaming of multi-media content over the Internet or from a media server, and the like. Additional impairments that can affect fidelity of the embedded watermarks may be due to various signal processing operations that are typically performed on multimedia content such as lossy compression, scaling, rotation, analog-to-digital conversion and the like. In most digital watermarking applications, the embedded watermarks must be able to maintain their integrity under such noise and distortion conditions.

The security of embedded watermarks is another aspect of watermarking systems. In certain applications, such as proof of ownership, source authentication, piracy tracing, access control of copyrighted content, it is essential that embedded watermarks resist intentional manipulations aimed at detecting the presence of watermarks, deciphering the data carried by those watermarks, modifying or inserting illegal values (forgery), and/or removing the embedded watermarks.

Another consideration in designing a watermarking system is the watermark payload capacity. This requirement depends on the specific application of the watermarking system. Typical applications range from requiring the detection of only the presence of the watermarks (i.e., requiring single-state watermarks) to requiring a few tens of bits of auxiliary information per second. In the latter case, the embedded watermarks may be used to carry identification and timing information such as serial numbers and timestamps, metadata, such as captions, artist names, purchasing information, etc.

Another factor in designing practical watermarking systems is computational costs of the embedding and/or extraction units. This factor becomes increasingly important for consumer electronic devices or software utilities that must be implemented with a limited silicon real estate or computational requirements. This factor can be strongly related to the intended use of the watermarking systems. For example, watermarks for forensic tracing of piracy channels, such as those that embed different codes in each copy of content distributed over Internet, require a simple embedder and may tolerate a complex and costly forensic extractor. On the other hand, copy-control systems designed to prevent unauthorized access to multi-media content in consumer electronic devices, for example, may tolerate a sophisticated embedder but require a simple and efficient extractor.

Yet another important factor in designing a watermarking system is the probability of false watermark detections. A false watermark can be produced when a watermark is detected from an unmarked content, or may be due to the detection of a watermark value that is different from the originally embedded watermark value. The desired levels of false watermark detection can also vary depending on the intended application of the watermarking system. For example, in copy-control applications, the probability of false detections must be very low (e.g., in the order of $10^{-12}$) since executing a restrictive action (e.g., stopping the playback of the content) due to a false watermark detection on a legally purchased content is bound to frustrate users and have negative implications for device manufacturers and/or content providers. On the other hand, for broadcast monitoring applications that, for example, track the number of times that a feature song has been broadcast in order to generate royalty payments or popularity charts, a relatively higher false detection rate (e.g., in the order of $10^{-6}$) may be tolerated since the presence of a few false detections may have very little effect on the final outcome of the counts.

Another important factor that impacts the overall performance of the watermarking system is the selection of a particular technology for watermark embedding and extraction. Making an optimum tradeoff between the above noted requirements, in view of the particular application at hand, is a very challenging task.

FIG. 1 is an exemplary watermarking system that can accommodate the disclosed embodiments. The original host content 102 is embedded with watermarks using the watermark embedder 104. The embedded host content 106 may be subject to additional signal processing operations such as compression, encryption, scrambling, modulation, and the like, prior to being stored and/or transmitted through one or more transmission/storage media 108. The watermark embedder 104 (or a device that is in communication with, or controls the operations of, the watermark embedder 104) may also be in communication with a storage device (e.g., the storage device 118 or another storage device) in order to store certain information related to the embedded host content 106. The stored information can include, but is not limited to, various content identification information including content name, content size, an industry-standard content identifier, value of embedded watermarks, copyright status of the content, content owner, hash values associated with content (as will be described in further detail in the sections that follow), and the like. Some or all the stored information can comprise an extraction record.

The transmitted and/or stored embedded content can be accessed by one or more content handling devices (e.g., content handling device A 110, content handling device B 112, content handling device C 114, etc.). A content handling device may receive a content and evaluate and/or process the content is some way. In one example, a content handling device can receive a content, extract embedded watermarks from the content or otherwise evaluate a copy control status of the content, and display, transfer, playback, copy and/or record the received content. A content handling device (such as the content handling device A 110) may further be in communication with one or more storage devices 116, 118 within a local network 122 or outside of the local network 122. A content handling device (such as content handling device A 110) may be in communication with other content handling devices (e.g., handling device B 112 and content handling device C) and may delegate some of its operations to one or more devices inside or outside of the local network 122. Communications with entities that reside outside of the local network 122 may be conducted through the gateway 120. It should be noted that in some example embodiments, the transmitted embedded host content may be received at a content handling device (such as the content handling device C) that is not part of a local network and subsequently processed with minimal or no communications with other entities.

Typical watermark-based copy control applications, such as those deployed in secure digital music initiative (SDMI), digital versatile disc-audio (DVD-A) and advanced access content system (AACS), require watermark screening prior or concurrently with each content use on each compliant device. Watermark screening and/or content screening are used in some embodiments to refer to operations that include, but are not limited to, examination of a content based on the value or state of the watermarks that are embedded therein in order to determine whether a use of the content conforms to a content use policy. The content use policy can, for example, include one or more rules governing the use of content, including, but not limited to, the conditions under which certain uses result in the taking of an enforcement action. Such enforcement actions include, but are not limited to, the elements of a content use policy that relate to an operation or a function that is performed when a specified type of use occurs, such as stoppage of content playback, transfer or recording, playback of a modified content (e.g., at lower resolution or shortened duration), insertion of advertisements, warning notices, and the like. The content use policy can also contain rules that do not control "usage" per se. For example, the content use policy can contain rules that report on the use of the content to a network server, or present an advertisement to the user, or take other actions.

It should be also noted that the term watermark extraction can refer to operations that include, but are not limited to, examination of a content to determine the presence of a watermark, and possible assessment of the auxiliary data within the detected watermark. In this context, watermark extraction can be carried out by a watermark extractor that can be configured to extract, process, decode and analyze the embedded watermarks to discern the presence of watermarks, to obtain the payload value of the embedded watermarks and, in some scenarios, discern some or all of the content use policy associated with the embedded watermarks. During extraction, the watermark is typically not removed from the content. However, the disclosed embodiments can also readily accommodate watermark extraction algorithms that remove the embedded watermarks during the extraction process.

Various operations, such as the extraction of watermarks from a content, the assessment of the content use policy associated with the extracted watermarks and the application of appropriate enforcement actions, can be distributed among one or more trusted entities and/or performed at different times (e.g., prior to content use) at one or more entities. Such a division/spreading of operations can result in a reduction of overall and/or peak processing load and is particularly advantageous in mobile device applications with limited battery life, or on multitasking platforms where spared processing power are available for use by other parallel processes. In one example scenario, the watermark extraction operations are conducted prior to the usage of a content to produce an extraction record that is securely stored. Such an extraction record can be utilized in subsequent uses of the same content and further enables the execution of watermark extraction independently from the actual content use, when, for example, the content handling device has spare cycles that can be dedicated to watermark extraction. Additionally, or alternatively, some or all of watermark extraction operations can be delegated to another device with more processing power or more spare cycles. The usage of extraction records, however, requires adequate security considerations to ensure secure storage, communication and/or utilization of the stored extraction record.

The reuse of extraction records can create a number of security challenges that do not exist in scenarios where each content use is accompanied with concurrent watermark extraction. An example that illustrates the vulnerability of using extraction records involves an attacker that attempts to replace a legitimate content (e.g., authorized for use) with a pirated content after the extraction record of the legitimate content is created and saved, while concealing such a replacement. In this scenario, a device may associate the extraction record of the legitimate content with the pirated content and allow access to the pirated content. In another example, an attacker may attempt to tamper with the extraction records by, for example, replacing a record that indicates unauthorized use with a record that indicates authorized use while concealing such a replacement. Again, the objective is to enable access to the pirated content. In yet another example, an attacker may attempt to interfere with the exchange of information between the device that stores the extraction record (e.g., a database, cloud, another device, etc.) and the content handling device that receives the content subject to screening obligation. This type of attack is sometimes referred to as the man-in-the-middle attack. One objective of this type of attack may be to associate a permissive extraction record with a content that is not authorized for use.

There are various cryptographic techniques that can be deployed to thwart the above noted attacks with various levels of complexity and security. However, cryptographic techniques can be compromised as evidenced, for example, with content scrambling system (CSS) that was designed to protect DVDs from piracy. Further, some cryptographic techniques can be computationally expensive, which increases the processing load at the moment of content use.

Some of the disclosed embodiments provide methods, systems and computer program products that mitigate the above noted security risks associated with the use of extraction records, and further discourage attacks on a watermarking system that utilize such extraction records. These embodiments facilitate the utilization of extraction records in cases where the extraction record carries permissive information (e.g., content is permitted for free use on a particular device), as well as in cases where the extraction record carries restrictive information (e.g., enforcement action is needed to protect content).

Figure 2:
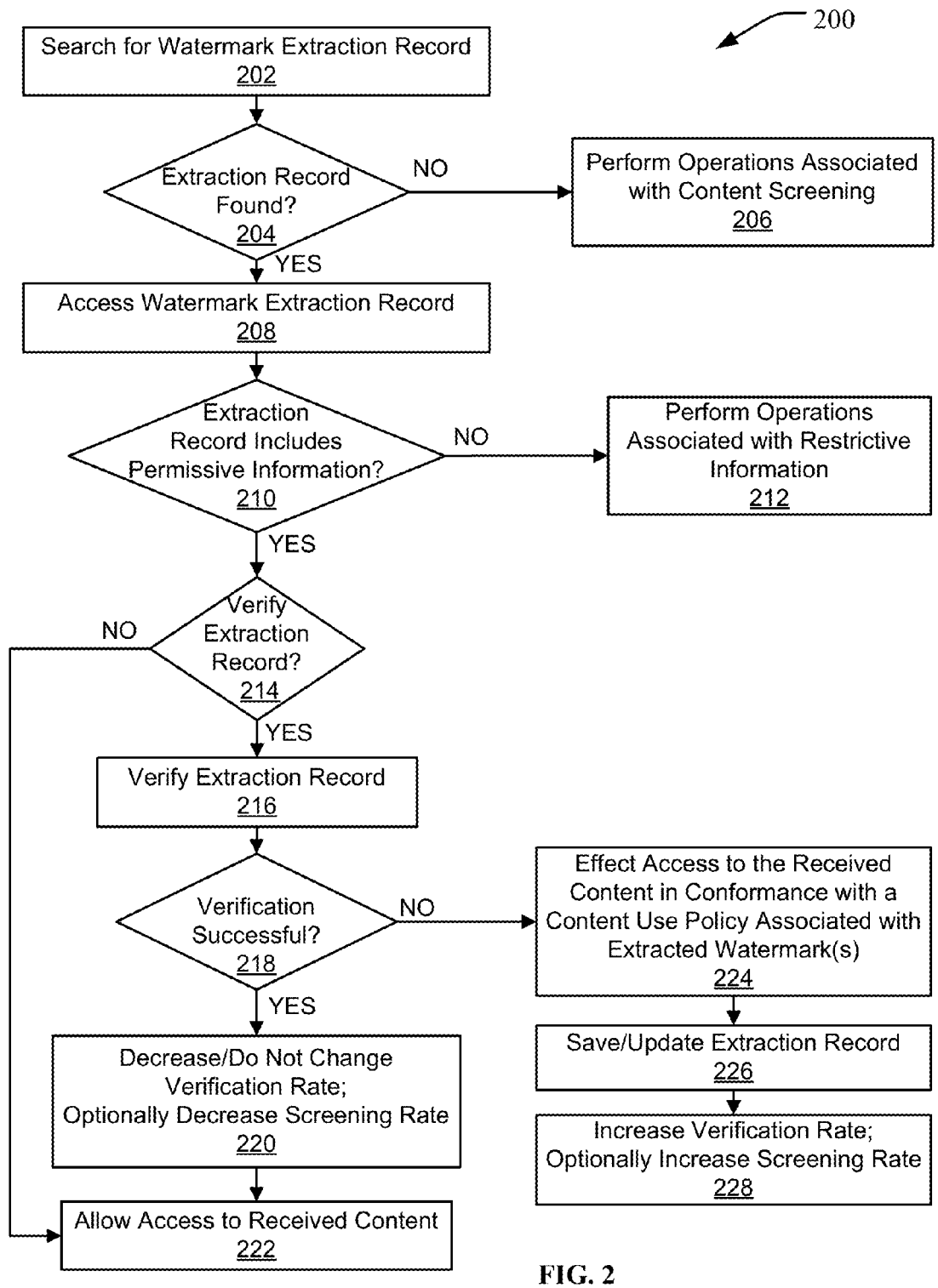
FIG. 2 illustrates a set of operations that can be carried out as part of utilization of watermark extraction records in accordance with an exemplary embodiment.

FIG. 2 illustrates a set of operations 200 that can be carried out as part of utilization of watermark extraction records in accordance with an exemplary embodiment. At 202, upon receiving a content that is subject to a watermark screening obligation, a search for a watermark extraction record for the received content takes place. At 204, a determination is made whether or not the extraction record is found. If the determination at 204 indicates that an extraction record could not be located (i.e., "NO" at 204), the operations 200 continue at 206, where operations associated with content screening are performed. If the determination at 204 indicates that an extraction record has been found (i.e., "YES" at 204), the operations 200 continue at 208, where the extraction record is accessed. The operations at 202 and 208 can include, but are not limited to, retrieving the extraction record from a storage location that is local (e.g., internal) or external to the media handling device. In some example embodiments, the extraction record is located within a secure network (e.g., a living network alliance (DLNA) network), an un-secure network, or a network with unknown security capabilities. The operations at 202 and 208 can also include transmitting a request to a database for receiving the extraction record, as well as various handshaking and/or authentication operations that may be necessary for establishing a link between the content handling device and the database. In some instances, however, the extraction record of a particular content may not exist in the accessed database. In these cases, the content handling device may try to access one or more alternative databases. For example the device may first attempt to retrieve the extraction record from a home-based storage location, and if it fails, the device may then try to retrieve the extraction record from a cloud-based storage location.

Figure 3:
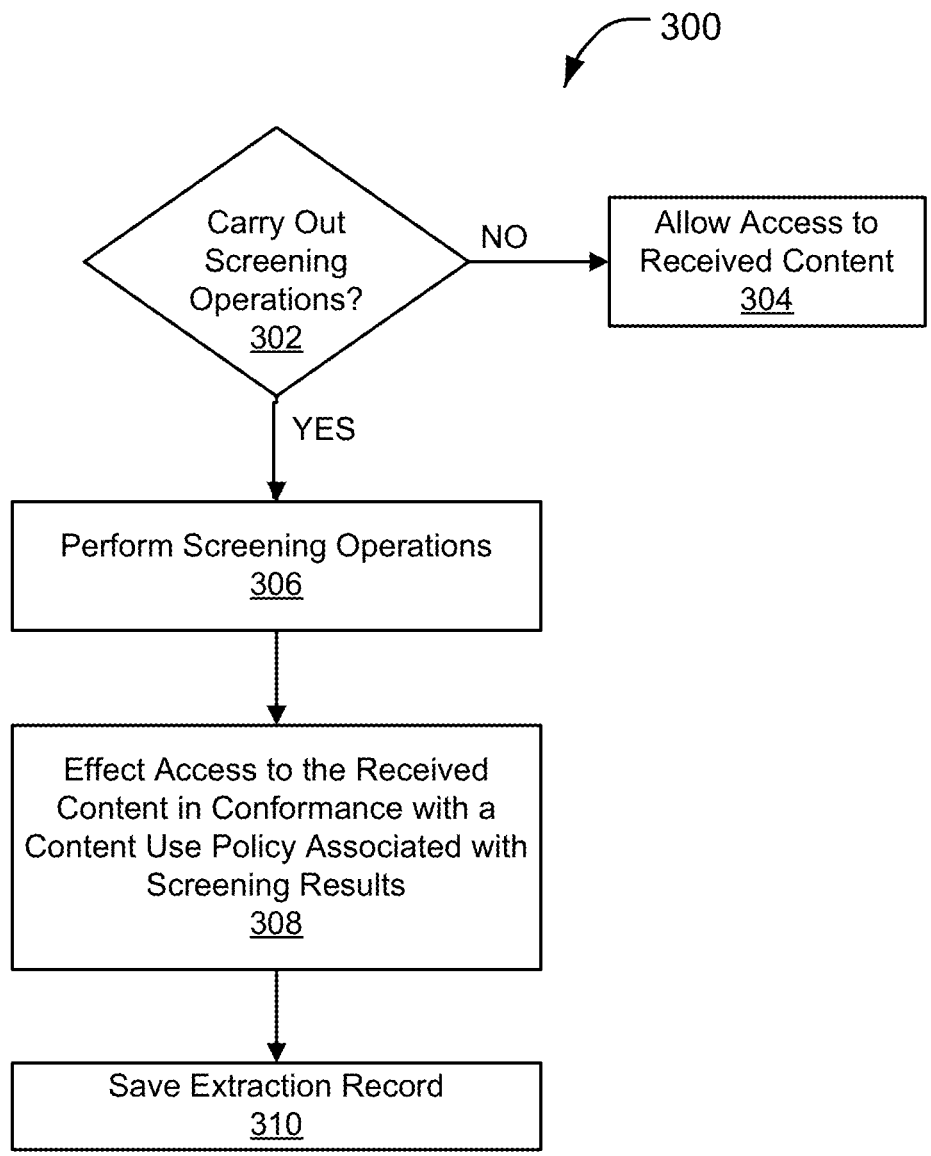
FIG. 3 illustrates a set of operations that can be carried out in response to obtaining extraction records that contain restrictive information in accordance with an exemplary embodiment.

Still some content may not have an extraction record in any of the databases. In this case, the device may have to screen the content concurrently or prior to content use. Before describing the remaining operations of FIG. 2, it is instructive to examine FIG. 3, which describes the operations that may be carried out as part of block 206 of FIG. 2. FIG. 3 illustrates a set of operations 300 that can be carried out when an extraction record is not found in accordance with an exemplary embodiment. At 302, it is determined whether or not to carry out content screening operations. In one example embodiment, the determination at 302 is made based on a screening rate, R, which can, for example, be defined as the ratio of number of contents without an extraction record that is screened to the total number of accessed contents without extraction records. The value of the screening rate, R, can be adjustable based on content use patterns as will be described in the sections that follow. The specified screening rate can be selected, for example, by using a random or a pseudorandom number generator to trigger the screening of content without an extraction record with probability R. In another example, the device may screen every M-th content that does not have an extraction record, where M=round(1/R). In some embodiments, the screening rate, R, is bounded by a minimum value (i.e., $K \leq R \leq 1$, where $K>0$). As will be described in connection with operations 220 and 228 of FIG. 2, in some embodiments, if the value of R is greater than K while the operations 200 are taking place, the operations at 220 can include decreasing the probability, R, in one or more steps until the minimum value, K, is reached, and operations 228 can include increasing the probability, R, in one or more steps until it reaches the value of 1.

Referring back to FIG. 3, if the determination at 302 indicates that content screening is not needed (i.e., "NO" at 302), the operations 300 continue at 304, where access to the received content is allowed. If the determination at 302 indicates that content screening is needed (i.e., "YES" at 302), the operations 300 continue at 306, where content screening operations are carried out. The operations at 306 can include extracting watermarks from the received content and analyzing the payload of the extracted watermarks to ascertain the associated copyright status of the content. At 308, access to the received content is effected in conformance with the content use policy associated with the screening results. For example, if no watermarks are extracted or the extracted one or more watermarks are indicative of free and full access to the content, the received content may be allowed to be accessed by the user with no restrictions. In other examples, the content use policy may allow the user to view the content at a lower resolution, at a time-delayed basis, view only a portion of the content, do not view the content, do not copy or transfer the content, and/or other operations as provided by the content use policy. It should be noted that the above list of content access permissions or prohibitions are only examples of how content access can be effected in conformance with content use policies. Therefore, additional or alternate operations can be carried out based on the appropriate policies. At 310, the results of the screening operation are saved as an extraction record. For example, the extraction record may be saved locally, and/or reported to one or more databases to allow future access to the content based on the saved extraction record.

Referring to FIG. 2, at 210 it is determined whether or not the watermark extraction record that was accessed at 208 includes permissive information. Permissive information can, for example, indicate that the associated content can be freely copied, played back or otherwise consumed. If the determination at 210 indicates that the extraction record does not include permissive information (i.e., "NO" at 210), the operations 200 continue at 212 where operations associated with restrictive information are performed. Additional details regarding with operations 212 will be discussed in connection with FIG. 4 in the sections that follow. If the determination at 210 indicates that the extraction record includes permissive information (i.e., "YES" at 210), the operations 200 continue at 214 to determine whether or not to verify the extraction record. The determination at 214 can be made using a verification rate, P, which can, for example, be defined as the ratio of the number of verified extraction records to the number of retrieved extraction records. The value of P is less or equal to one, and for devices that are rarely accessing unauthorized content, the value of P is typically much less than one, which results in significant savings in processing load and/or reduced delays in accessing the content. Note that the verification rate, P, can be dynamically adjusted. For example, the decision as to verify an extraction record can be carried out using a random or a pseudorandom number generator that randomly (or pseudo-randomly) selects to verify the extraction record with probability P. In another example, the device may verify every N-th extraction record, where N=round(1/P). Alternatively, the verification rate, P, can be selected deterministically to occur at predetermined instances in time or at predetermined content access attempts.

Referring back to FIG. 2, if the determination at 214 indicates that extraction record is not to be verified ("NO" at 214), then access to the received content is allowed at 222. However, if the determination at 214 indicates that the extraction record is to be verified ("YES" at 214), the operations 200 continue at 216, where the extraction record is verified. The operations at 216 can include attempting to extract one or more watermarks from the content, and determining whether or not the extracted watermarks contain information that is consistent with the permissive information obtained from the extraction record. The watermark extraction that is conducted as part of the verification operations at 216 must be done prior to, or concurrently with, the content use, which may delay content use or increase the processing load at the device. In some embodiments, as part of operations at 216, a copy control state of an extracted watermark is compared to a copy control state of the extraction record to determine if the two match one another. For example, a successful verification is obtained if the accessed extraction record indicates that a content can be accessed with no restrictions, and the extraction attempts also result in the extraction of watermarks with specific payloads that indicate free access to the content is permissible (and/or if no watermarks are detected).

At 218, it is determined if the verification operations at 216 were successful. If the determination at 218 indicates a successful verification (i.e., "YES" at 2108), the operations 200 continue at 220, where the verification rate is either decreased, or is untouched. In some embodiments, the verification rate, P, is bounded by a minimum value (i.e., $L \leq P \leq 1$, where $L>0$). As such, in these embodiments, if the value of P is greater than L while the operations 200 are taking place, operations at 220 can include decreasing the probability, P, in one or more steps, with a minimum limit of L. In one example embodiment, the value of L is set to 0.01 and the initial or default value of P is 0.1. That is, there is a 10% chance that a verification operation is conducted when the watermark extraction record is accessed. With each successful verification of an extraction record, the value P is multiplied by 0.9. However, P is not allowed to drop below the minimum level of 0.01. The value of L and the choice as to whether or not to decrease the verification rate (or leave it unchanged) at 220 are design parameters than can be selected based on, for example, the application of the watermarking system, the type of watermarks that are extracted, the content usage policy, and the like. The operations at 220 can also include decreasing the screening rate, R, as was discussed in connection with FIG. 3. As noted earlier, in some example embodiments, the screening rate, R, is bounded by a minimum value (i.e., $K \leq R \leq 1$, where $K>0$). In a specific example, K has a value of 0.1 and the initial or default value of R is 0.5. That is, there is a 50% chance that content without an extraction record is screened. In this example, with each successful verification of the extraction record, the value R can be multiplied by, for example, 0.9 (i.e., reduced by 10%) at 220. However, the value of R is not allowed to drop below the minimum value of 0.1. The value of K and the choice as to whether or not to decrease the screening rate (or leave it unchanged) at 220 are design parameters than can be selected based on, for example, the application of the watermarking system, the type of watermarks that are extracted, the content usage policy, and the like. The operations 200 next continue at 222, where access to the received content is allowed.

Referring to FIG. 2, if the determination at 218 indicates that the verification operations are not successful (i.e., "NO" at 218), the operations 200 continue at 224, where access to the content is effected in conformance with content use policy associated with the extracted watermarks. A failure in verification operation can, for example, include extracting a watermark that is indicative of a "no copy allowed" state, while the accessed extraction record indicates the content is, for example, freely accessible. In this example scenario, the operations at 224 may provide for unrestricted viewing of the content while preventing copying of the content. The operations at 224 can alternatively, or additionally, include notifying a user of the content handling device (or a content owner) that an unauthorized use of the content may be in progress. Such a notification, as will be described in the sections that follow, can present alternative options to the user to allow authorized usage of the content. The operations 200 next continue at 226, where the extraction record is saved/updated with the results of the extraction record verification operations. For example, the verification results can be reported to a database with an additional indication that the verification of the extraction record for the received content has failed. The database may then save/update the extraction record with the new verification results.

The operations 200 next continue at 228, where the content verification rate is increased, if possible (i.e. if it has not already reached its maximum allowable value of, for example, 1). In one example embodiment, the operations at 228 include increasing the value of probability, P, or reducing the extraction record count between verification operations. Further, at 228, the screening rate, R, of content without an extraction record can be increased, if the screening rate is not already at its maximum value of, for example, 1. A verification failure that is detected at 218 can indicate that the security of the watermarking system has been compromised and the accessed extraction record cannot be trusted. As a consequence, the operations at 228 increase the verification rate, thereby requiring additional watermark extractions to take place. This, in turn, increases the processing load for subsequent content uses and/or results in delays in accessing subsequent contents due to screening operation that are carried out prior to the content use. Furthermore, a failed verification may trigger an increase in screening rate for content without verification record, which can also increase the processing load and/or cause delays in accessing the content.

In one example embodiment, if a verification failure is detected at 218, the verification rate, P and/or screening rate, R, are set to one at 228. In this example embodiment, every subsequent content use (e.g., at a particular device or by a particular user) is subject to content screening operations that include watermark extraction. In some example implementations, the probability (or rate) of verification can be reduced upon subsequent authorized usages of the content, as illustrated at 220. In other example embodiments, the obligation to extract watermarks for every content use subsequent to a verification failure may remain in place until the device is reset by an authorized party or entity. As a result, the opportunity to reduce the processing load of the content handling device, or to achieve prompt access to the content, and to obtain other associated advantages, can be fully or partially forfeited when such an attack on the watermarking system is launched. Therefore, there is no significant incentive for a professional attacker to tamper with the usage of watermark extraction records, or for the users to utilize such workarounds. On the other hand, authorized uses of content in accordance with proper extraction records can reduce the processing load or avoid delays in accessing the content, thereby rewarding users that comply with content usage rules. The operations that are described in FIG. 2 further reduce security requirements on all elements of the extraction record exchange, which in turn makes this exchange less processing intensive.

Figure 4:
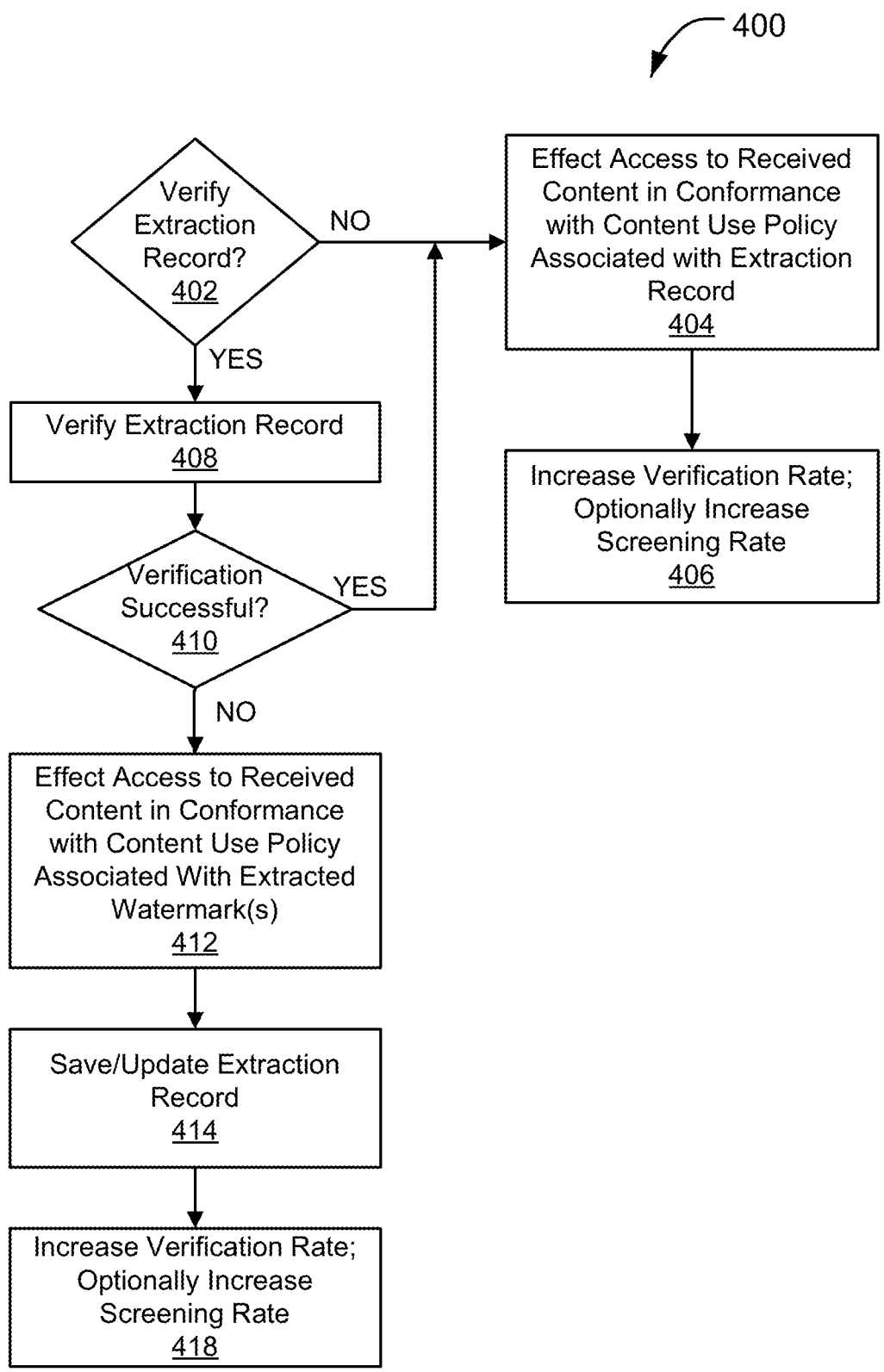
FIG. 4 illustrates a set of operations that can be carried out at a database containing extraction records in accordance with an exemplary embodiment.

FIG. 4 illustrates a set of operations 400 that may be carried out in response to obtaining extraction records that contain restrictive information (e.g., as part of operations 212 in FIG. 2) in accordance with an exemplary embodiment. At 402, the decision to verify the watermark extraction record is made. One objective of this verification is to identify an attack where the extraction records are maliciously forged to contain restrictive record in order to create user discontent and compromise the system. Another objective of this verification is to identify an attack where an extraction record with more restrictive information is replaced with an extraction record with less restrictive information. Similar to the discussions in connection with FIG. 2, the operations at 402 may be based on a random (or pseudo-random) decision making process with probability, Q, or carried out deterministically with a regular frequency. If the determination at 402 indicates that verification is not selected (i.e., "NO" at 402), the operations 400 continue at 404, where access to the content is effected in conformance with the content use policy of the extraction record. Next, at 406, the verification rate, P, and, optionally, the screening rate, R, are increased, if the respective rates are not already at their maximum value. It should be noted that, in some embodiments, the verification of the extraction record is not performed at all when the extraction record includes restrictive information. Therefore, in such embodiments, the operations 400 merely consist of effecting access to the content based on content use policy associated with the extraction record, and sometimes increasing the verification and/or screening rates.

Referring back to FIG. 4, if the determination at 402 indicates that verification of the extraction record need to be carried out (i.e., "YES" at 402), the operations 400 continue at 408, where the extraction record is verified. The operations at 408 can include attempting to extract one or more watermarks from the content, and determining whether or not the extracted watermarks contain information that is consistent with the restrictive information obtained from the extraction record. The watermark extraction that is conducted as part of the verification operations at 408 are carried out prior to, or concurrently with, the content use, which may delay content use or increase the processing load at the device. In some embodiments, as part of the operations at 408, a copy control state of an extracted watermark is compared to a copy control state of the extraction record to determine if the two match one another.

At 410, the determination is made as to whether or not the verification was successful, and if so (i.e., "YES" at 410), the operations 400 continue at 404 and 406. If, on the other hand, the verification of the extraction record was not successful (i.e., "NO" at 410), the operations 400 continue at 412, where access to the received content is effected in conformance with the content use policy associated with the extracted watermarks. The operations 400 then continue at 414, where the extraction record is saved/updated with results of the extraction record verification operations. For example, the verification results can be reported to a database with an indication that the verification of the extraction record for the received content has failed. The database may then save/update the extraction record with the new verification results. At 418, the verification rate is increased (if already not at the maximum value of, for example, 1), and the screening rate is optionally increased (if already not at the maximum value of, for example, 1). It should be noted that the increases in verification and/or screening rates at 406 and 418 may be carried out using the same or different incremental steps. As such, in some embodiments, the verification and/or screening rates increase at a faster pace (i.e., in larger increments) if carried out as part of operations at 418 compared to increases that are effectuated as part of operations at 406. Similarly, the increases in the verification and/or screening rates as part of operations at 228 in FIG. 2 may be carried out using a different increment than those carried out as part of operations at 406 and/or 418 of FIG. 4.

In order to minimize the chances of not having an extraction record in any of the databases, an extraction record may be generated for every professionally-released content. The produced extraction records may then be stored at a generally accessible location, such as at a database that is accessible through the Internet, or reside in the cloud, to facilitate access to extraction records by all devices that can establish a connection (e.g., a secure connection) with the storage location. In some embodiments, the extraction records are added to a database of extraction records by the content owner or a trusted third party (e.g., a content distributor). Those extraction records can be created by watermark embedders themselves (e.g., as part of watermark embedding process), or by devices that access content and comply with watermark extraction obligation and content use policy. In some cases, the devices that are used for the purpose of database population with extraction records may be configured with a specially adjusted verification rate, R, of unity (i.e., R=1) in order to ensure that each content access attempt results in the creation of an extraction record.

In some embodiments, the extraction records can be automatically created by the first compliant device that screens a particular instance of the content. The extraction records can then be transferred to the generally accessible location for subsequent use by the same device or other devices. In these embodiments, care must be taken to ensure that the compliant device has not been compromised. To this end, a variety of handshaking and authentication protocols may be used to verify and/or to authenticate the compliant device. All compliant devices that subsequently encounter the identical instance of the content may use the extraction record created by the first device. However, in some embodiments, if the content is transformed in a certain way (e.g., content encryption is removed, content is edited, recompressed to a smaller size, etc.), the content is treated as a new content instance that requires a new extraction record. It should be noted that some copyrighted content is distributed exclusively in encrypted format and, therefore, the existence of an unencrypted copy of the content can be indicative of unauthorized content tampering. It is thus important to efficiently and reliably discriminate different instances of the same content and to create a separate extraction record for each unique content instance. In some embodiments, two instances of a content are considered to be identical if they are bit-by-bit identical to one another. However, in certain implementations, a bit-by-bit comparison of contents is not feasible. As such, in some embodiments that will be discussed in the sections that follow, the determination as to whether or not two content instances are identical is carried out by comparing one or more aspects of the two content instances.

Another example scenario that requires the extraction of watermarks is the case where a user-generated content (as opposed to a professionally-released content) is accessed for the first time. Watermark extraction for such a user-generated content may be necessary since many pirated movies are distributed over the Internet under the disguise of user generated content. According to some embodiments, if a user generated content is encountered for the first time by a compliant device, a watermark extraction processes may take place to generate an extraction record. The generated extraction record can be communicated to a generally accessible location, and subsequently accessed by all compliant devices that encounter the same instance of the content at a later time.

In another exemplary scenario, watermark extraction may be necessary if a device that receives a content cannot communicate with another entity to obtain the associated extraction records. Such a scenario can arise, for example, if the device communication link is disabled by the user, the device is in a remote or isolated location, or the device is not equipped to communicate with other entities, and the like. In these cases, the device can perform watermark extraction operations concurrent with, or prior to, content usage. In some embodiments, a compliant device (e.g., a device that access content, comply with watermark extraction obligation and/or otherwise is considered a trusted or authorized device) is capable of storing the extraction record locally (e.g., locally within the device or within a compliant network such as a DLNA network). In these embodiments, the necessity to communicate (at least directly) with an "outside" entity is avoided. Therefore, a user device that encounters a content for a first time may create an extraction record that is stored locally and accessed when the content is subsequently accessed by the device or another device in the local network.

As discussed in connection with FIGS. 2 through 4, the use of existing extraction records can reduce the processing load of a complaint content handling device or reduce content access delay, which are caused by watermark extraction operations. The occasional invocation of the watermark extractor only increases the processing load or content access delay intermittently, and can become even less burdensome if the content is used according to its intended content use policy that results in reducing the number of times that watermark extraction is performed (see, for example, operations at 220 in FIG. 2).

Extraction records that are used in accordance with various disclosed embodiments can be associated with each unique instance of a content. These extraction records can contain information including, but not limited to, presence or absence of embedded watermarks, one or more payload values (or states) associated with watermarks that are embedded in the content, an associated time stamp that designates the temporal location of the extracted watermark within the content, one or more hash values associated with the content and/or extraction record, one or more digital signatures associated with the content and/or extraction record, CRC and/or error correction parity symbols associated with the content, a file name identifying the content and/or extraction record, a file size associated with the content, additional information identifying the content (e.g., a serial number, an industry standard identification code, etc.), as well as other information that can facilitate utilization of the extraction record.

Identification and retrieval of extraction records that reside at a database can be done based on identity (e.g., the name) of a particular content instance. However, such an identification technique requires a different content name for each unique instance of the content. As such, this identification scheme fails to discriminate between multiple instances of a content (e.g., authorized versus tempered with content), which may all have the same identity. Moreover, an attacker may attempt to populate the database with false extraction records associated with known content names in order to cause system malfunctioning and user complaints. For example, an attacker could maliciously try to create an extraction record that includes restrictive information for a content with that should be associated with permissive information. Therefore it is important to be able to discriminate between different versions of a content in a fashion that is also hard to forge.

In some embodiments, one or more hash functions are used to identify each unique instance of a content. A hash function can be construed as any procedure that takes an input block of data and returns a fixed size output block of data (i.e., a hash value) such that any change in input data is very likely to produce a change in the hash value. It is to be noted that error detection or error correction codes (such as cyclic redundancy codes, Reed-Solomon codes, etc.) can provide such functionality, as well as cryptographically secure hash functions (such as MD5 and SHA-1). Using a hash function, a hash value (also referred to as a bit string identifier) can be generated for each unique instance of the content, or portions of that instance of the content. The generated hash value(s) can be associated with the corresponding extraction record and stored at the database. It should be noted that throughout this document, sometimes the term "association" (or its variants) with respect to the extraction record is used to convey that the extraction record is linked in some fashion with a particular type of information. For example, an extraction record can be associated with one or more corresponding hash values. Such an association can include, but is not limited to, one or more of: placing the hash value(s) in the extraction record, using the hash value(s) as part of the file name that identifies the extraction record, indexing (or mapping) the extraction record based on the hash value.

Figure 5:
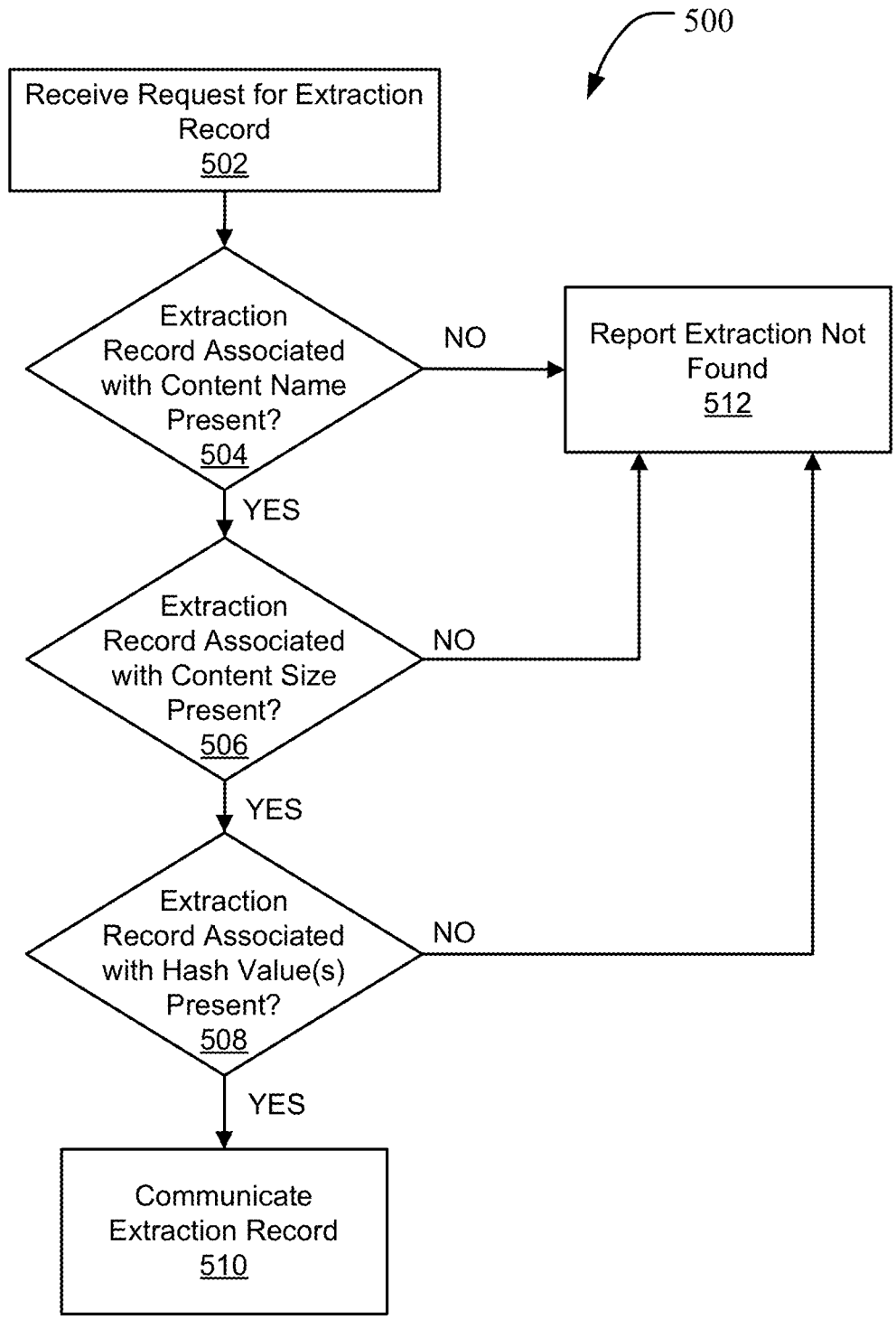
FIG. 5 illustrates a set of operations that can be carried out to facilitate the use of extraction records for a streaming content in accordance with an exemplary embodiment.

In one embodiment, the extraction records are associated with multiple types of information. For example, an extraction record is not only associated with the hash value(s) but also with the associated content name and, optionally, with the content size. FIG. 5 illustrates a set of operations 500 that can be carried out at a database containing extraction records in accordance with an exemplary embodiment. At 502, the database (e.g., the storage location or locations that contain content extraction records) receives a request for a particular extraction record from a requesting entity. The request for the extraction record can include one or more types of content identification information such one or more hash values, a content name and a content size. The requesting entity can transmit the request directly or indirectly to the database. Such a requesting entity can be a complaint content handling device that has received a content subject to screening obligation. In some embodiments, one or more handshaking and/or authentication operations (not shown) are conducted before and/or after receiving the request at 502 to authenticate the credentials of the requesting entity. This way, communications with unauthorized devices may be avoided.

At 504, it is determined whether or not the database contains an extraction record with the same content name as the one that appears in the request. If an associated extraction record is not found (i.e., "NO" at 504), the operations 500 continue at 512, where a message is transmitted to the requesting entity indicating that an extraction record cannot be found. The operations at 512 can also include requesting from the requesting entity to conduct watermark screening operations and transmit the generated extraction record to the database. If the determination at 504 indicates that a content name match is found (i.e., "YES" at 504), the operations 500 continue at 506, where it is determined if the extraction record is associated with the same content size as provided by the requesting entity. If the content size fails to match (i.e., "NO" at 506), the operations 500 continue at 512 to inform the requesting entity that no match is found, and to optionally asking the requesting device to perform screening operations and provide the extraction record to the database.

If the determination at 506 indicates that a content size match is obtained (i.e., "YES" at 506) the operations 500 continue at 508 to determine if the hash value(s) of the extraction record match the hash value(s) provided as part of the request at 502 well enough, as described below. If the determination at 508 indicate that the hash value(s) do not match well enough (i.e., "NO" at 508), the operations 500 continue at 512. Otherwise, if hash value(s) match well enough (i.e. "YES" at 508), the operations 500 continue at 510, where the extraction record is provided to the requesting entity.

It should be noted that the operations 500 provide for verification of three different types of content identification information (i.e., content name, content size and hash value(s)) in order to establish a particular level of confidence that the correct extraction record has been provided to the requesting party. Further, the use of a multi-level search enables a finer differentiation of different variations of the same content. For example, the operations at 508 allow different versions of a content with the name and file size to be differentiated. It is, however, understood that the operations 500 of FIG. 5 can utilize fewer or additional types of content identification information to conduct fewer or additional matching operations. Further, in some embodiments, the order in which the information types are matched may be modified. An important consideration in implementing the set of operations 500 of FIG. 5 is that the probability of false attack detection should be very small. False attack detection may occur when the calculated hash value (e.g., the bit-string identifier) by chance matches another hash value in the database that is associated with an extraction record with permissive information, while the actual content is unauthorized for use. The chances of occurrence of this event are reduced by including content name and content size verification in the operations 500 of FIG. 5. Furthermore, the probability of false attack detection can be minimized by increasing the length of bit sting/hash value that identifies the content. Additionally, database management policies can be implemented to reduce the chances of false attack detection. For example, extraction records from database that haven't been accessed over a predefined period of time can be systematically purged to not only reduce the probability of false attack detection, but to also reduce the processing load and memory requirements within the database.

In some embodiments, in order to minimize the processing load, hash calculations may be executed only on a fraction of the content data. For example, a few kilobytes of content data may be used for hash calculations even though the content size may be several megabytes. In some embodiments, in order to prevent an attacker from manipulating the content to produce a particular hash, the selection of content segments that are used for hash calculations is made cryptographically secure. For example, the selection of content segments is carried out using a cryptographic technique that utilizes a secret key. In some embodiments, at least one of a number of segments, an extent of each segment, and a location of each segment within the received content is selected pseudo-randomly. In some embodiments, content segments are selected in a content dependent fashion. This way, the hash values that are calculated for the selected segments can accommodate contents of different sizes. Further, if the selection pattern of content segments for a particular content is somehow discovered by an attacker, this knowledge cannot be used to attack other contents.

In some embodiments, the location of content segments selected for hash value calculations can be done by the database of extraction records (i.e., an entity that resides at the database) upon receiving a request for an extraction record for a content with a specified name and size. The location of data segments may be communicated from the database to the requesting device in a cryptographically secure fashion. This way, an attacker cannot ascertain the location of content segments, and circumvention attempts that involve replacing select segments of an unauthorized content with authorized content segments can be thwarted. Alternatively, the selection of content segments for hash calculations that are, for example, conducted as a function of content name and size, can be programmed within the device in a cryptographically secure fashion.

In many practical scenarios, a content may get damaged when distributed through a noisy communication channel. For example, optical disks can be scratched, and files that are electronically distributed using packet networks may get corrupted due to packet loss. When a corrupted content is received at a content handling device with screening obligations, the content handling device may request the associated extraction record from a database using one or more hash values. The hash values that accompany such a request are calculated using the damaged content segments and, therefore, cannot be matched against the hash values that are associated with the stored extraction record. As a result, the content handling device may be forced to perform watermark screening operations. In some embodiments, in order to reduce the chances of performing unnecessary watermark screening operations, multiple hash values are calculated for each content based on distinct content data subsets. If a fraction of calculated hash values match the hash values associated with a stored extraction record, then a successful content identification is declared and the corresponding extraction record is retrieved and transmitted to the requesting party. This way, there is an increased probability that the extraction record associated with a particular content can be identified even in the presence of some content damage. In some embodiments, the distinct content data subsets that are used for multiple hash value calculations are selected pseudo-randomly in a cryptographically secure manner in order to thwart an attacker's attempts to identify and manipulate the distinct content data subsets. In some embodiments, the selected content data comprise only a fraction of the entire content data in order to achieve efficient content identification.

Figure 9:
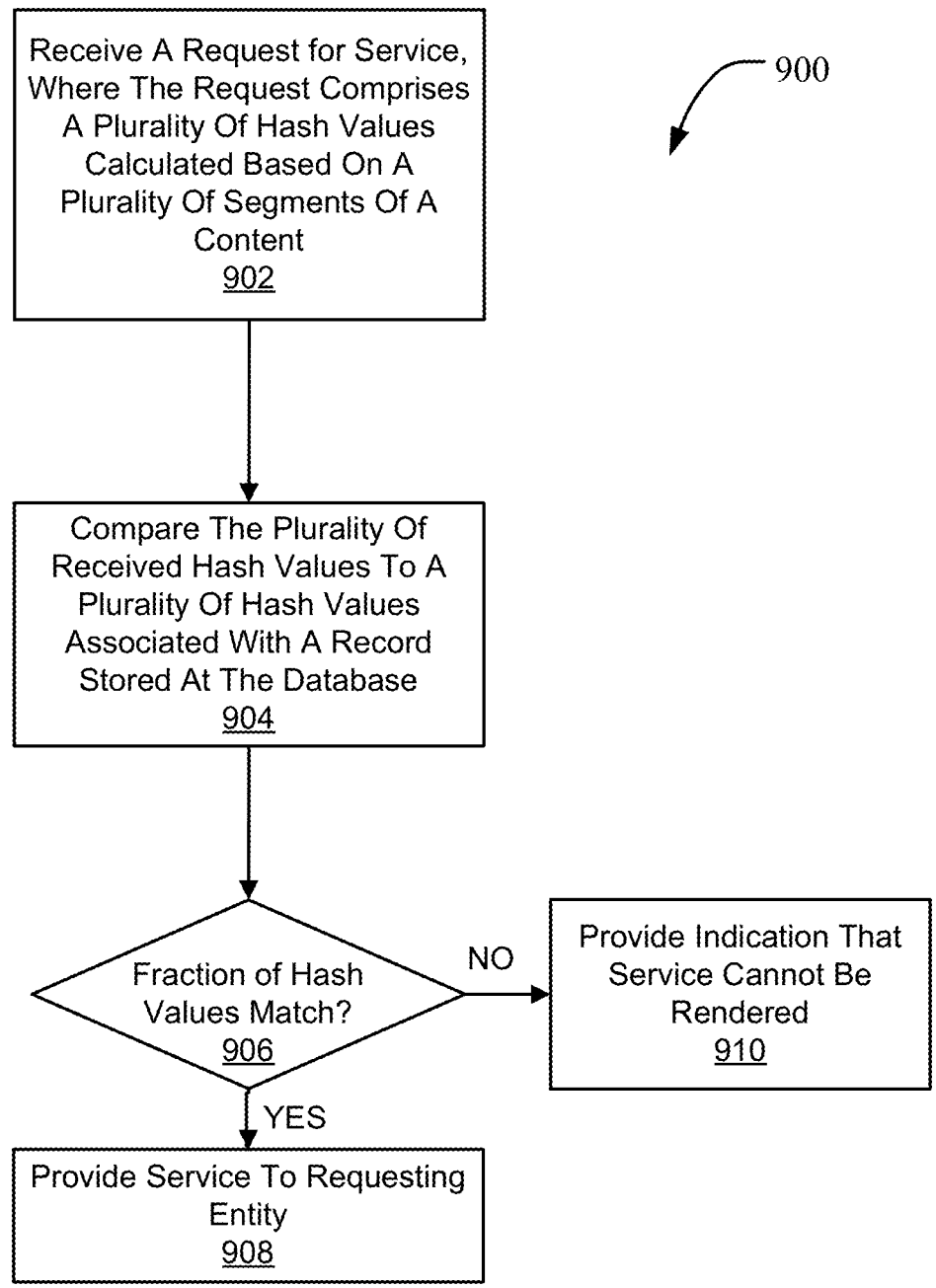
FIG. 9 illustrates a set of operations that can be carried out to provide a service in accordance with an exemplary embodiment.

FIG. 9 illustrates a set of operations 900 that can be carried out to provide a service in accordance with an exemplary embodiment. Such a service can include, but is not limited to, providing one or more of an extraction record, a content, one or more advertisements and the like, to a requesting entity. At 902, a request for a service is received. Such a request includes a plurality of hash values calculated based on a plurality of segments of a content. At 904, the plurality of received hash values are compared to a plurality of hash values associates with a record at the database. At 906, it is determined if at least a fraction of the received hash values match the corresponding hash values associated with the stored record. If the determination at 906 is indicative of a successful match between at least a fraction of the received and stored hash values (i.e., "YES" at 906), the operations 900 continue at 908, where the requested service is provided to the requested entity. If the determination at 906 is indicative of an unsuccessful match between at least a fraction of the received and stored hash values (i.e., "NO" at 906), the operations 900 continue at 910, where an indication is provided that the requested service cannot be rendered.

As noted earlier, the use of only a partial match between the plurality of received and stored hash values can be particularly advantageous when a content is partially damaged due to, for example, content handling and/or content transmission through a noisy transmission channel. The use of a plurality of hash values provides a powerful identification scheme for such a content. In particular, when a first received hash value is successfully matched against a stored hash value, such a match confirms the identity of the associated content segment with a very high level of confidence since hash values are hard to forge. In fact, in some scenarios, such a single match may be sufficient by itself to uniquely identify a content. When a second received hash value is successfully matched against another stored hash value, such a match increases the confidence in content identification even more. This confidence level is further improved with each additional matching of hash values. Moreover, since, according to some embodiments, the selection of particular content segments for hash calculations is done in a pseudo-random fashion that is dictated by the database, matching of two or more received and stored hash values provides an even higher confidence that hash values are not forged by an attacker. Multiple hash value matching is also advantageous in scenarios where an attacker attempts to circumvent content copyright protection by combining a pirated content with segments of an authorized content and hopes that hash function calculations will be executed on legitimate content segments only.

The use multiple content segments for hash calculations in the presence of content damage can be illustrated by considering the following example. A movie that is professionally created and stored on a DVD is divided into a number of Video Object Units (VOU-s). A subset, J, of the VOU-s is randomly selected by the extraction record database, where the selection may be different for each content title and content size. The device attempting to access the content computes the bit-stream identifiers (e.g. hash values) for each of the selected VOU-s, and submits them to the database. The database may decide that submitted hash values identify the content adequately if at least a particular number, I, of the VOU-s match the stored hash values, where $0<I<J$. For example, for $I=J/2$, a content is identified when only half of the computed hash values match the stored hash values. In the above example, the unmatched hash values (which, in this example, can make up to almost 50% of the VOU-s) can be attributed to content damage. However, the remaining VOU-s that are correctly matched, are considered to provide a well-enough match with negligible probability of false identification.

According to some embodiments, calculation of hash values for a content that is distributed in encrypted format is performed on the encrypted content. This way, it is possible to discriminate content that is protected by different encryption algorithms or is not encrypted at all. For example, in a content protection scheme, only certain encryption techniques may be authorized or trusted and, therefore, a content that is encrypted with a trusted technique is likely to be associated with a different enforcement action than a content that is encrypted with an encryption technique that is not trusted. Moreover, even different trusted encryption techniques may be subject to different enforcement actions. Calculation of hash values using the encrypted content further reduces the additional processing load that is associated with decrypting the content and then calculating the hash values.

Often content is distributed electronically in small chunks or packets in a packet network. In such cases, the content chunks are received at the destination and reassembled prior to content use. In some exemplary embodiments, calculation of the hash values is conducted after the content is reassembled in the desired order in order to avoid keeping track of distinct hash values that depend on content distribution protocols. In some embodiments, hash values are calculated on strings of data with known positions within the content as a whole. In some instances of content, such as in a DVD data structure, the content is divided into units with internal information about its location within the content that can be used to facilitate the selection and identification of content segments for hash calculations. For example, the location of each video object unit in DVD data structure is known and, therefore, can be used as known reference points to facilitate hash calculations. In some embodiments, the location of each string of data that is subject to hash calculation can be obtained according to a symbol (e.g., byte) count relative to a reference location, such as the beginning, of the content. Each segment of the content that is a candidate for hash calculations can be identified by a beginning and an end location relative to the reference point, and each such segment can be used to calculate a hash function.

The disclosed embodiments further facilitate the utilization of extraction records when a user receives streaming content (also referred to as a real-time content) that is subject to screening obligation. In a streaming scenario, content playback starts before the entire content is delivered to the content handling device. In such a scenario, it may not be possible to calculate hash values for the entire content, as could be done when an entire content file is present on the content handling device. According to some embodiments, performance of devices that handle streaming content can be improved by introducing a grace period, during which the content may be accessed (e.g., played back, recorded, transferred, copied, etc.) without screening or extraction record retrieval. During the grace period, one or more hash values can be calculated and used to request the associated extraction record. The hash value in a streaming application is calculated on a fraction of the content during the grace interval in order to reduce processing load. The selection of the particular content segments during the grace period can be carried out in a pseudo-random and cryptographically secure fashion. Similar to the non-streaming scenario, multiple hash values can be calculated per grace interval, and extraction record identification at the database can take place based on finding a match for a fraction of the calculated hash values. The grace interval may have a pre-determined duration that is selected to meet security and operational requirements of the watermarking system. Such a grace interval may be modified or updated as needed.

In some embodiments, the generation of content identification information (e.g., the generation of hash values) for a streaming content is more efficiently carried out by calculating hash values once per grace interval. If content damage (e.g. due to intentional attacks or packet loss) renders the calculated hash value unusable, the content handling device may simply abandon content identification for the duration of that particular grace interval, and grant another grace interval that allows unrestricted user access to the streaming content. This procedure can be repeated, but an upper limit on the number of consecutive grace interval extensions can be provided in order to thwart an attacker's attempts to simulate content damage to avoid screening of the content. For example an audiovisual content may be streamed with one-minute grace interval. During the grace interval, access to the content is permitted and the hash value is calculated. At the end of grace interval the calculated hash value is compared to the hash value stored in the extraction record, and if a match is found, extraction record is used to effect content access in conformance with the use policy. If no match is found, the device may assume that the content damage may have caused the hash value mismatch and, therefore, commence the next grace interval. In one example, embodiment, this procedure of allowing additional grace intervals may be limited to up to five grace intervals, and after five successive hash mismatches, it is assumed that the content does not have saved extraction record, and the screening operation is commenced.

Figure 6:
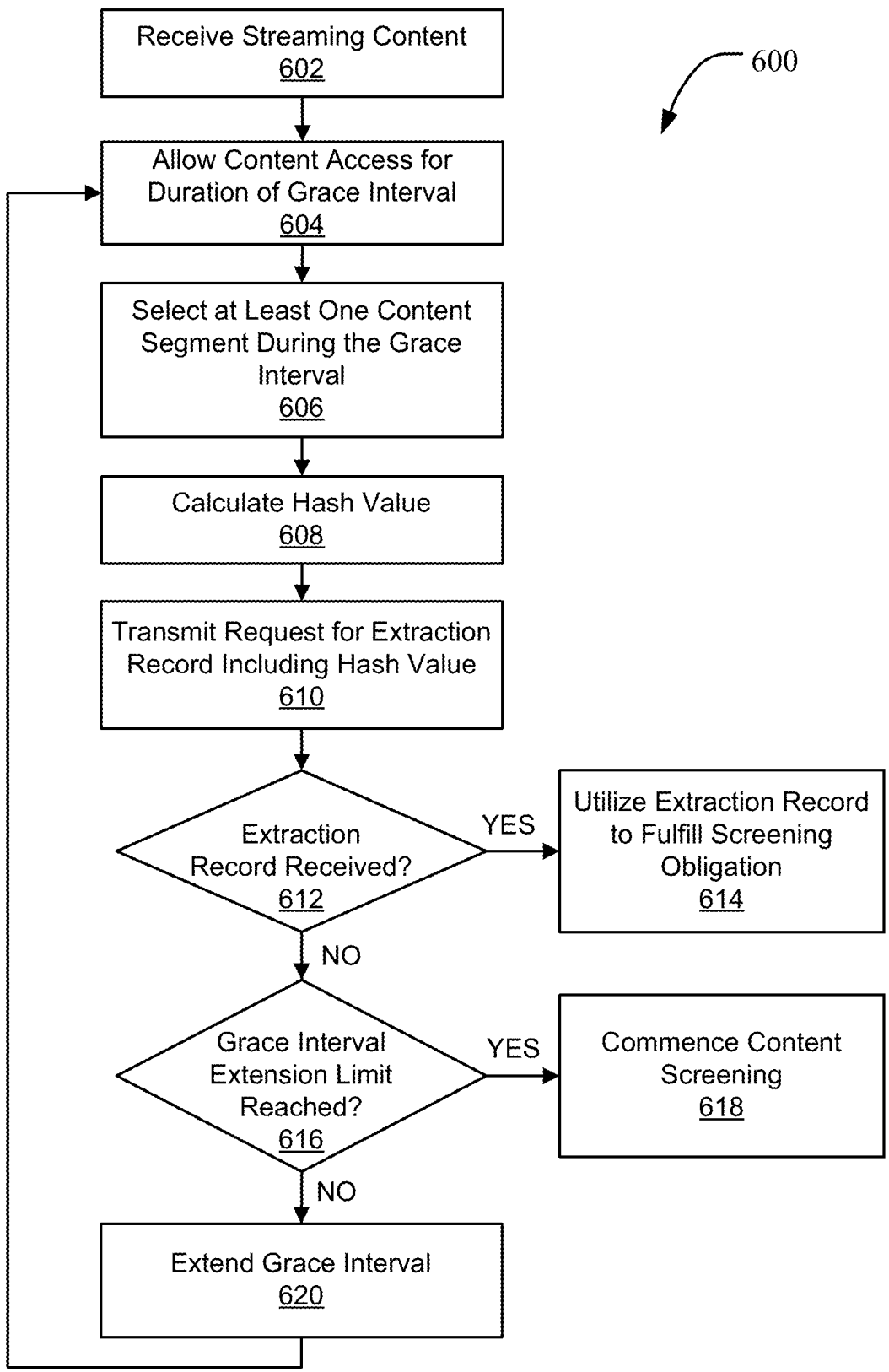
FIG. 6 illustrates a set of operations that can be carried out to facilitate the use of extraction records for a streaming content in accordance with an exemplary embodiment.

FIG. 6 illustrates a set of operations 600 that can be carried out to facilitate the use of extraction records for a streaming content in accordance with an exemplary embodiment. At 602 a streaming content is received at a content handling device with content screening obligations. For example, such a streaming content may be an audio or video content that is received in real-time from a database at a content handling device with screening obligations. At 604, the content handling device allows access (e.g., rendering, display, playback, etc.) to the content for the duration of a grace interval. It should be noted that in some embodiments, there is a time lag (i.e., latency) between the operations at 602 and 604. Such a time lag may be necessary for conducting various signal processing operations (e.g., to decompress, descramble, acquire synchronization between multiple streams, etc.) on the received content, or may be mandated by broadcast rules (e.g., 7-second delay mandated by the Federal Communication Commission (FCC)). During the time lag, the streaming content is often buffered in memory.

Referring back to FIG. 6, at 606, at least one content segment of the content during the grace interval is selected. In one example embodiment, only a single segment is selected at 606. At 608, a hash value for the selected content segment is calculated. As noted earlier, the operations at 608 are not limited to calculating a hash value in the classic definition of a hash function. But rather, in some embodiments, operations at 608 can include obtaining one or more identification values, including but not limited to, a CRC value, an error correction code value, and the like, to identify the selected segment in an efficient manner.

At 610, a request for the extraction record is transmitted that includes the calculated hash value(s). The request at 610 is communicated directly, or indirectly through another entity, to the database containing the extraction records. The request at 610 can include additional information, such as a content name or other content identifying information. Upon the receipt of the request, the database conducts a search to locate the extraction record. The operations at the database can, for example, be carried out using some or all of the operations 400 that are illustrated in FIG. 4. At 612, it is determined whether or not the extraction record is received. The operations at 612 can include evaluating a response that is received from the database. Such a response can include the requested extraction record (if found) or a message indicating that the requested extraction record cannot be located. It may be possible that subsequent to transmitting the request at 610, the content handling device does not receive a response within the desired time period (e.g., by the time the grace interval, or a fraction thereof, expires). In this case, the content handling device may assume that the extraction record is not found.

If the determination at 612 indicates that the extraction record is received (i.e., "YES" at 612), the operations 600 continue at 614, where the extraction record is utilized to fulfill the content screening obligation in an efficient manner. For example, some or all of the operations 200 and 300 that are illustrated in FIGS. 2 and 3, respectively, can be carried out at 614. If, on the other hand, the determination at 612 indicates that the extraction record is not received (i.e., "NO" at 612), the operations 600 continues at 616, where it is determined if the grace interval limit has been reached. Such a limit can be set and/or updated according to the content usage rules and policies.

If the determination at 616 indicates that the grace interval limit is reached (i.e., "YES" at 616), the operations 600 continue at 618, where content screening operations are commenced. In some embodiments, the operations at 618 include watermark extraction operations that are carried out in parallel with allowing access to the content. In other example embodiments, the operations at 618, which include watermark extraction operations, are carried out prior to allowing access to the content. In the latter example embodiments, the user may experience some delay in accessing the content. If the determination at 616 indicates the grace internal limit has not been reached (i.e., "NO" at 616), the operations 600 continue at 620, where the grace interval is extended. The operations 600 then return to 604 to allow content access for the duration of extended grace interval.

In some embodiments, watermark extraction records can be verified randomly by extracting watermarks from randomly selected segments of the content. This random verification operation can be carried out regardless of whether the content is received in full or is received in a streaming fashion. In some example embodiments that relate to streaming applications, the content handling device randomly selects a particular grace interval and performs content screening operations in parallel with hash value calculation while content is being accessed (e.g., as part of the grace interval). At the end of the grace interval, the extraction record is compared against the results of the content screening operations. If the extraction record and the content screening results do not match, the use of extraction records may be abandoned and/or other mitigating actions may be taken, as, for example, illustrated in FIGS. 2 through 4.

In some embodiments, the streaming content includes an associated extraction record as part of the streaming content overhead. Such an extraction record can be incorporated within the streaming content by a compliant or trusted streaming server. In some variations of these embodiments, the content handling device that receives the streaming content calculates the hash value for full segment of the content corresponding to one grace interval, and compares the calculated hash value to the hash value provided as part of the extraction record, with occasional watermark extractions to verify the received extraction record. This approach is particularly advantageous when the incorporated extraction record is also used as the grace interval delimiter, thus helping the content handling device to correctly identify grace interval boundaries.

According to some embodiments, when the extraction record information is indicative of unauthorized use of the content, the user is informed promptly about the content status. In a file-based application, where the entire content is available to the content handling device prior to content use, the user can be prompted immediately after the detection of an unauthorized use. In content streaming applications, the user can also be prompted immediately after the determination of an unauthorized use, as well as when the grace interval expires. This is contrasted with user notifications that are provided in some copy control systems where substantial playback time may elapse before an enforcement action, and the associated user notification, is effectuated. For example, some watermark-based copy management systems allow more than 20 minutes of playback time before an enforcement action commences. In contrast, the user notification that is provided based on extraction records in accordance with the disclosed embodiments can provide user notifications within a few minutes (or even a few seconds) of content playback. Another advantage of using extraction records to fulfill screening obligations is that can provide a copyright protection system that is not solely reliant on watermark extractor implementations developed by various third party implementers. As such, extraction-record-based screening can cure certain deficiencies (e.g., bugginess) of some watermark extractor implementations that can potentially lead to the detection of fewer or incorrect watermarks.

According to some embodiments, upon determination of unauthorized use of the content, the user may be offered some options beyond the enforcement action associated with the detected watermark states. Moreover, provided options may change over time. For instance, a user may be offered an opportunity to access the content by paying a small fee. Alternatively, or additionally, the user can be offered to view or listen to advertisements in exchange for not implanting the enforcement action. Furthermore, a user may be informed as to how to obtain an authorized instance of the content, or where the content is presented in theaters. These and other enhanced responses, once approved by the content owner or another authorized party, can provide reasonable alternatives to the strict enforcement actions that are sanctioned by the content usage rules.

In providing enhanced responses to unauthorized use, it is important to be able to correctly and automatically identify the received content. As noted earlier, such an identification can be carried out (albeit not a very reliably) by reading the content's name. Additional information can assist in content identification, including the use of content size and hash values.

In some watermarking systems, content identification can carried out more reliably by embedding specific watermarks in the content to carry content identification codes. Such a content may also be embedded with copy control watermarks that often require a smaller payload. The embedded content identification codes can be associated with content metadata during the embedding process. Alternatively, the content identification codes can be associated with content metadata after the content is released to public. In this alternate scenario, an extractor can be used to extract the embedded watermarks from an already released content to obtain the content identification codes and populate the appropriate metadata database. The link between the embedded identification codes and the content metadata can be stored at a database and available for access from compliant devices. During content use at a content handling device, an extractor may find an embedded content identification code and retrieve the associated metadata over the Internet to effect reliable content identification. However, in some cases content may be distorted and watermark extraction by the content handling device may be difficult. For example, a distorted content may be produced when a movie that is being shown in a movie theatre is camcordered. In those cases, it is possible, even likely, that copy control watermarks are extracted much sooner than the content identification codes. Therefore, an enforcement action associated with the copy control watermarks may commence prior to the identification of the content and/or presentation of alternate options to the user.

According to the disclosed embodiments, a trusted party or entity may download contents that are intended to be protected by copy control watermarks but are still offered over the Internet for unauthorized use. The trusted party can then evaluate the content, and produce an extraction record comprising one or more associated hash value for each content instance. The produced extraction record also includes the correct copy control status and correct content metadata. Subsequently, a compliant content handling device may receive the same content that is downloaded over the Internet. The content handling device calculates the hash value and retrieves the extraction record. This record may provide enhanced options that are more flexible than the standard enforcement actions. In the absence of such an extraction record, the complaint device enforces the standard actions, which are often more restrictive and inflexible than the enhanced options. As a consequence, the user has no incentive to obstruct the extraction record retrieval. Moreover, fulfilling content screening obligations based on the disclosed embodiments that use extraction records does not suffer from the delayed content identification problem associated with embedded content identification codes. In fact, content identification code embedding may not be needed at all in systems that utilize extraction records.

In some embodiments, a user may have the option of disabling some or all of the enhanced options (e.g., coupons, advertisements, etc.) which may be offered to the user. While such enhanced options were previously described in the context of extraction records with restrictive information, these and other enhanced features can be provided to the user even if the extraction record contains permissive information. However, a user may not wish to receive and/or view the enhanced options while using the content. Therefore, in some embodiments, the user is given the option disable some or all of the advanced options for content that is being used in accordance with its authorized making authorized use of the content.

One consideration when retrieving extraction records from a remote location (e.g., the cloud) is that there may be a delay associated with establishing the link between the content handling device and the remote location, calculating the hash values, transmitting the request for extraction records, and receiving the response from the remote location. Such a delay can become an inconvenience to the user in both the streaming and file-based content. According to some embodiments, in order to remove this inconvenience and to encourage users to participate in extraction record production and exchange, when the content is initially accessed, an initial access period is designated, during which the user can access the content without fulfilling screening operations (i.e., the content is freely accessible regardless of copy protection status of the content). The initial access period differs from the grace interval described in connection with the streaming content in that it is provided for only the initial portion of the content and is not extendable. Moreover, according to the disclosed embodiments, the presence of both the initial access period and grace interval is not precluded in content streaming applications. In one example, the initial access period is increased to include the grace interval duration. In one example embodiment, the initial access period is selected to be 30 seconds. If the extraction record cannot be retrieved during the initial access period, the content handling device initiates watermark screening operations that includes watermark extractions.

Figure 7:
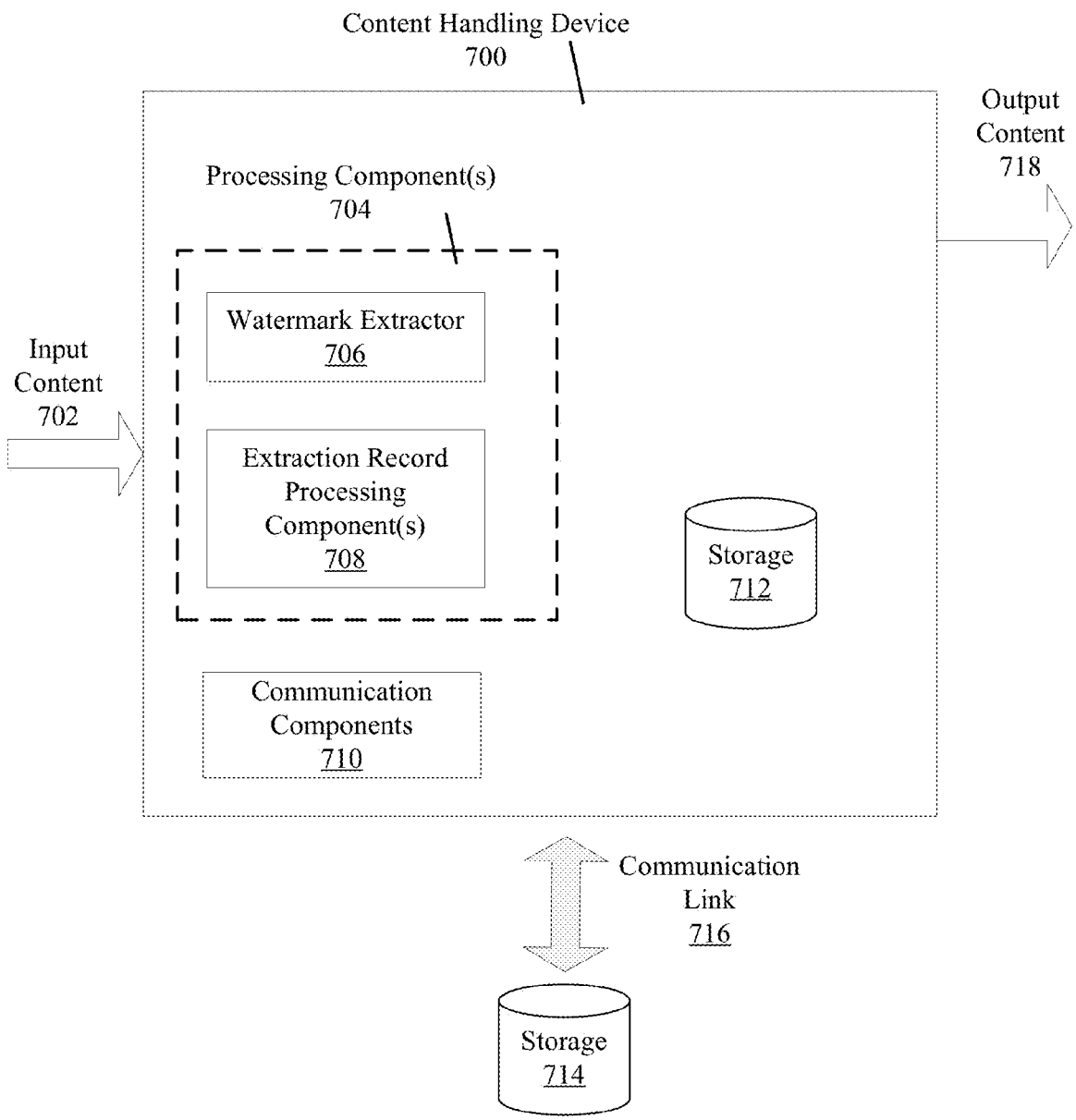
FIG. 7 illustrates an exemplary content handling device that may be used to accommodate the some of disclosed embodiments.

FIG. 7 illustrates an exemplary content handling device 700 that may be used to accommodate the some of disclosed embodiments. The content handling device 700 may conduct one or more operations such as rendering, recording, copying, transferring and/or playback of an input content 702. The input content 702 may be communicated to the content handling device 700 through one or more communication channels comprising wired and/or wireless communication channels, magnetic, optical, Flash and/or other computer readable media, or other sources. The communication components 710 may be configured to receive the input content 702, to communicate with other entities such as storage device 714 and other content handling devices (not shown). FIG. 7 also illustrates processing components 704 that can be configured to conduct at least some of the operations that are discussed in connection with FIGS. 2 through 5. The processing components can include a watermark extractor 706 that is configured to extract embedded watermarks from the input content 702. The processing components 704 further can include extraction record processing components 708 that can be configured to request and receive watermark extraction records, select one or more segments of the content, compute hash values, verify the extraction records, provide indications as to whether or not verification of extraction records were successful, provide notifications to the users, and the like. Some of the operations that are depicted in flow diagrams of FIGS. 2 to 5 may be carried out by components or subcomponents within the content handling device 700 that are not shown in FIG. 7.

FIG. 7 also illustrates one or more storage units 712 that can reside within the content handling device 700. Such storage units 712 can store the input content 702 (e.g., in encrypted, partially encrypted or clear format), watermark extraction records associated with various contents, content authentication information, compliance rules associated with the usage of embedded content and the associated enforcement actions, as well as computer program code that can be retrieved in order to implement any one of the functionalities of the disclosed embodiments. As such, the storage unit 712 can be in communication with various components of the content handling device 700, such as the processing components 704, one or more micro processors, digital signal processing units, display drivers components, etc. within the content handling device 700. These components can retrieve and utilize the information, the computer codes and the content that are stored on the storage units 712. The content handling device 700 can also provide an output content 718, as well as notifications and additional information, to a user of the content handling device. One or more components of a content handling device, such as the content handling device 700 of FIG. 7, are capable of producing indications (e.g., signals, bit values, etc.) to one or more components of the content handling device and/or to an external entity. Such signals can, for example, enable or inhibit a particular operation by other components and/or provide notifications to other components, entities, or even users of the components. Those components that receive such indications may use the received indication(s) to perform various operations. In one example, the extraction record processing components 708 provide an indication to the watermark extractor 706 to commence conducting watermark extraction operations that may or may not result in the detection of watermarks.

It is understood that the various embodiments of the present disclosure may be implemented individually, or collectively, in devices comprised of various hardware and/or software modules and components. In describing the disclosed embodiments, sometimes separate components have been illustrated as being configured to carry out one or more operations. It is understood, however, that two or more of such components can be combined together and/or each component may comprise sub-components that are not depicted. Further, the operations that are described in various figures of the present application are presented in a particular sequential order in order to facilitate the understanding of the underlying concepts. It is understood, however, that such operations may be conducted in a different sequential order, and further, additional or fewer steps may be used to carry out the various disclosed operations.

Figure 8:
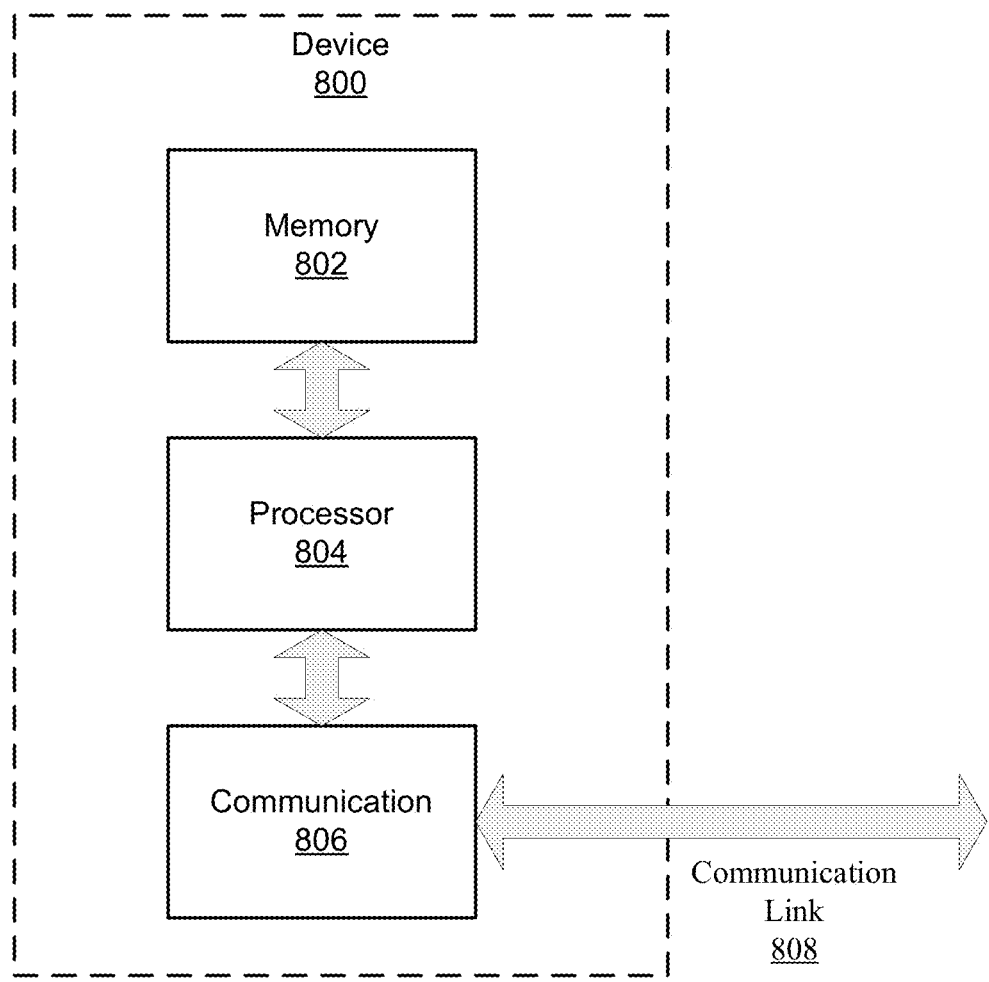
FIG. 8 illustrates a simplified diagram of a device within which various disclosed embodiments may be implemented.

In some examples, the devices that are described in the present application can comprise a processor, a memory unit, an interface that are communicatively connected to each other, and may range from desktop and/or laptop computers, to consumer electronic devices such as media players, mobile devices and the like. For example, FIG. 8 illustrates a block diagram of a device 800 within which various disclosed embodiments may be implemented. The device 800 comprises at least one processor 802 and/or controller, at least one memory 804 unit that is in communication with the processor 802, and at least one communication unit 806 that enables the exchange of data and information, directly or indirectly, through the communication link 808 with other entities, devices, databases and networks. The communication unit 806 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. The exemplary device 800 that is depicted in FIG. 8 may be integrated into as part of a content handling device to carry out some or all of the operations that are described in connection with FIGS. 2, 3 and 5.

In some embodiments, the device 800 of FIG. 8 may also be incorporated into a device that resides at a remote database containing watermark extraction records to perform some or all of the operations that are described in connection with FIG. 5. In these embodiments, the processor 804 can be configured to process a request received from a content handling device to, for example, determine if the hash values that are included in the received request match an extraction record at the database.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. A content that is embedded with watermarks in accordance with the disclosed embodiments may be stored on a storage medium. In some embodiments, such a stored content that includes one or more imperceptibly embedded watermarks, when accessed by a content handling device (e.g., a software or hardware media player) that is equipped with a watermark extractor and/or a content screening component, can trigger a watermark extraction process and/or alternate operations that are intended to fulfill a content screening obligation, as well as subsequent operations by the content handling device components that are disclosed in the present application.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
receiving, at a content handling device, a streaming content subject to a content screening obligation;
allowing access to the received streaming content for a duration of an initial access period spanning an initial portion of the received streaming content;
allowing access to the received streaming content for a duration of a grace interval;
selecting at least one segment of the streaming content during the grace interval;
calculating one or more hash value(s) for the selected segment(s);
requesting an existing watermark extraction record, the request comprising the calculated hash value(s), the existing watermark extraction record residing on a non-transitory storage medium, the existing watermark extraction record having been produced prior to receiving the content by, at-least in-part, extracting watermarks that are embedded in the content and storing watermark extraction results in the non-transitory storage medium, thereby allowing watermark extraction to be at least partially bypassed when the content is subsequently accessed; and
upon a failure to receive the existing extraction record within the grace interval, allowing access to the received streaming content for an extended grace interval if the extended grace interval duration is within a grace interval extension limit.

2. A method, comprising:
receiving, at a content handling device, a streaming content subject to a content screening obligation;
allowing access to the received streaming content for a duration of a grace interval;
selecting at least one segment of the streaming content during the grace interval;
calculating one or more hash value(s) for the selected segment(s), wherein the one or more hash value(s) comprises a hash value that is calculated for a content segment that spans an entire duration of the grace interval;
requesting an existing watermark extraction record, the request comprising the calculated hash value(s), the existing watermark extraction record residing on a non-transitory storage medium, the existing watermark extraction record having been produced prior to receiving the content by, at-least in-part, extracting watermarks that are embedded in the content and storing watermark extraction results in the non-transitory storage medium, thereby allowing watermark extraction to be at least partially bypassed when the content is subsequently accessed; and upon a failure to receive the existing extraction record within the grace interval, allowing access to the received streaming content for an extended grace interval if the extended grace interval duration is within a grace interval extension limit.

3. A method, comprising:

at a receiver device at a database, receiving a request for a service, the request comprising a content name, a content file size and a plurality of hash values calculated based on a plurality of segments of a content;

performing the following three comparison operations to establish a particular level of confidence level in identifying an existing record residing at the database:
  comparing the content name to a content name associated with the existing record stored at the database,
  comparing the content file size to a content file size associated with the existing record stored at the database, and
  comparing the plurality of received hash values to a plurality of hash values associated with the existing record stored at the database; and upon a determination that the content name matches the content name associated with the existing record stored at the database, the content file size matches content file size associated with the existing record stored at the database and a match is found between at least a fraction of the plurality of received hash values and the plurality of hash values associated with the existing record, transmitting, using a transmitter device, the requested service to a requesting entity.

4. A device, comprising:

a receiver configured to receive a streaming content subject to a content screening obligation; and a processing component configured to:

produce an indication that access to the received streaming content is allowed for duration of an initial access period spanning an initial portion of the received streaming content;

produce an indication that access to the received streaming content is allowed for a duration of a grace interval;

select at least one segment of the streaming content during the grace interval;

calculate one or more hash value(s) for the selected segment(s);

request an existing watermark extraction record, the request comprising the calculated hash value(s) the existing watermark extraction record residing on a non-transitory storage medium, the existing watermark extraction record having been previously produced by, at-least in-part, extracting watermarks that are embedded in the content and storing watermark extraction results in the non-transitory storage medium, thereby allowing watermark extraction to be at least partially bypassed when the content is subsequently accessed;

upon a failure to receive the existing watermark extraction record within the grace interval, determine whether or not a grace interval extension limit has been reached; and upon a determination that the grace interval extension limit has not been reached, produce an indication that access to the received streaming content is allowed for an extended grace interval.

5. A device, comprising:

a receiver configured to receive a streaming content subject to a content screening obligation; and a processing component configured to:

produce an indication that access to the received streaming content is allowed for a duration of a grace interval;

select at least one segment of the streaming content during the grace interval;

calculate one or more hash value(s) for the selected segment(s), wherein the one or more hash value(s) comprises a hash value for a content segment that spans an entire duration of the grace interval;

request an existing watermark extraction record, the request comprising the calculated hash value(s) the existing watermark extraction record residing on a non-transitory storage medium, the existing watermark extraction record having been previously produced by, at-least in-part, extracting watermarks that are embedded in the content and storing watermark extraction results in the non-transitory storage medium, thereby allowing watermark extraction to be at least partially bypassed when the content is subsequently accessed;

upon a failure to receive the existing watermark extraction record within the grace interval, determine whether or not a grace interval extension limit has been reached; and upon a determination that the grace interval extension limit has not been reached, produce an indication that access to the received streaming content is allowed for an extended grace interval.

6. A device, comprising:

a receiver configured to receive a request for a service at a database, the request comprising a content name, a content file size and a plurality of hash values calculated based on a plurality of segments of a content;

a processing component configured to conduct the following three comparison operations to establish a particular level of confidence level in identifying an existing record residing at the database:
  compare the content name to a content name associated with the existing record stored at the database,
  compare the content file size to a content file size associated with the existing record stored at the database, and
  compare the plurality of received hash values to a plurality of hash values associated with the existing record stored at the database; and a transmitter configured to transmit the requested service to a requesting entity in response to a determination by the processing component that the content name matches the content name associated with the existing record stored at the database, the content file size matches content file size associated with the existing record stored at the database and a match is found between at least a fraction of the plurality of received hash values and the plurality of hash values associated with the record.

* * * * *